US009860943B2

(12) United States Patent
Missbach

(10) Patent No.: US 9,860,943 B2
(45) Date of Patent: Jan. 2, 2018

(54) BACKPLANE DEVICE

(75) Inventor: Robert Missbach, Kreischa/ot Baerenklause (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 28 days.

(21) Appl. No.: 13/820,395

(22) PCT Filed: Sep. 1, 2011

(86) PCT No.: PCT/EP2011/065086
§ 371 (c)(1),
(2), (4) Date: Mar. 1, 2013

(87) PCT Pub. No.: WO2012/028678
PCT Pub. Date: Mar. 8, 2012

(65) Prior Publication Data
US 2013/0154498 A1  Jun. 20, 2013

(30) Foreign Application Priority Data

Sep. 1, 2010  (EP) .................................... 10174976
Jun. 16, 2011  (EP) .................................... 11170254
Aug. 23, 2011  (EP) .................................... 11178551

(51) Int. Cl.
*H05B 33/08* (2006.01)
*G09G 3/20* (2006.01)
(Continued)

(52) U.S. Cl.
CPC ........... *H05B 33/08* (2013.01); *G09G 3/2081* (2013.01); *G09G 3/2085* (2013.01); *G09G 3/325* (2013.01);
(Continued)

(58) Field of Classification Search
CPC .... G02B 26/02; G11C 11/4063; G09G 3/342; G09G 3/3406; G09G 3/3426;
(Continued)

(56) References Cited

U.S. PATENT DOCUMENTS 7,292,209 B2 * 11/2007 Rast .......................... G09G 3/00
315/169.3
7,764,279 B2 * 7/2010 Tang et al. ..................... 345/204
(Continued)

FOREIGN PATENT DOCUMENTS

WO  2006/066919 A1  6/2006
WO  2006/128069 A2  11/2006
(Continued)

OTHER PUBLICATIONS

International Search Report, dated Apr. 10, 2012, issued in priority International Application No. PCT/EP2011/065086.

*Primary Examiner* — Jennifer Mehmood
*Assistant Examiner* — Sardis F Azongha
(74) *Attorney, Agent, or Firm* — Saul Ewing Arnstein & Lehr LLP

(57) ABSTRACT

The present invention relates to a backplane device for a light source matrix. A light source is preferably a LED or an OLED. A pixel circuitry of the backplane device is assigned to a light source of the light source matrix for controlling the light source. One light source and one pixel circuitry constitute a pixel. The pixels of the light source matrix are classified according to a pixel characteristic. The order of switching the light sources on and/or off depends on the pixel characteristic and not necessarily on the location of the pixel on the backplane device. A current being applied to the light sources is controlled by at least one driver. The at least
(Continued)

one driver is electrically connectable to at least one pixel. The at least one driver is not belonging to the pixel circuitry of the pixel.

32 Claims, 10 Drawing Sheets

(51) Int. Cl.
*G09G 3/325* (2016.01)
*G09G 3/3266* (2016.01)
*G09G 3/3283* (2016.01)
*H04N 13/02* (2006.01)
*G03H 1/02* (2006.01)

(52) U.S. Cl.
CPC ........ *G09G 3/3266* (2013.01); *G09G 3/3283* (2013.01); *H04N 13/0285* (2013.01); *G03H 2001/0212* (2013.01); *G09G 2300/0809* (2013.01); *G09G 2300/0814* (2013.01); *G09G 2310/0213* (2013.01); *G09G 2310/0218* (2013.01); *G09G 2310/0221* (2013.01); *G09G 2310/0227* (2013.01); *G09G 2310/0259* (2013.01); *G09G 2310/0262* (2013.01); *G09G 2310/0272* (2013.01); *G09G 2320/043* (2013.01); *G09G 2330/021* (2013.01)

(58) Field of Classification Search
CPC ... G09G 2310/0259; G09G 2310/0262; G09G 2310/0213; G09G 2310/0221; G09G 2310/0227; G09G 2310/0272; G09G 2310/0218; H05B 33/08; H05B 33/0803; H05B 33/0806; H05B 33/0833; H05B 33/0875; G08G 3/2081; G08G 3/2085; G08G 3/325; G08G 3/3266; G08G 3/3286; G08G 3/30
See application file for complete search history.

(56) References Cited

U.S. PATENT DOCUMENTS

| | | | |
|---|---|---|---|
| 8,049,713 B2 * | 11/2011 | Sampsell | 345/108 |
| 8,259,044 B2 * | 9/2012 | Nathan et al. | 345/82 |
| 2003/0222592 A1 | 12/2003 | Tsai et al. | |
| 2004/0257352 A1 * | 12/2004 | Naugler et al. | 345/204 |
| 2005/0243024 A1 | 11/2005 | Sempel et al. | |
| 2006/0273999 A1 * | 12/2006 | Yamazaki et al. | 345/81 |
| 2007/0229408 A1 * | 10/2007 | Primerano | G09G 3/2022 345/76 |
| 2008/0048951 A1 * | 2/2008 | Naugler et al. | 345/82 |
| 2008/0204431 A1 * | 8/2008 | Chung | G09G 3/2014 345/204 |
| 2009/0040414 A1 * | 2/2009 | Kawachi | 349/48 |
| 2009/0109248 A1 * | 4/2009 | Huber et al. | 345/694 |
| 2009/0303162 A1 * | 12/2009 | Kohno et al. | 345/76 |
| 2011/0157167 A1 * | 6/2011 | Bennett | G06F 3/14 345/419 |
| 2011/0316872 A1 * | 12/2011 | Wu | G09G 3/3426 345/589 |

FOREIGN PATENT DOCUMENTS

| | | |
|---|---|---|
| WO | 2007/127100 A1 | 11/2007 |
| WO | 2011/113843 A1 | 9/2011 |

* cited by examiner

Fig. 4a

| Operation | G Y0 | G Y1 | Y0 | Y1 | Y2 | Y3 | GX 0 | GX 1 | X0 | X1 | X2 | X3 | Enable E |
|---|---|---|---|---|---|---|---|---|---|---|---|---|---|
| Enable pixel | 0 | 1 | 0 | 1 | 0 | 0 | 1 | 0 | 0 | 0 | 1 | 0 | 1 |
| Enable pixel | 1 | 0 | 0 | 0 | 1 | 1 | 0 | 1 | 0 | 1 | 0 | 0 | 1 |
| Enable pixel | 0 | 1 | 0 | 0 | 0 | 0 | 1 | 0 | 0 | 0 | 1 | 0 | 1 |
| Enable pixel | 1 | 0 | 0 | 1 | 0 | 1 | 1 | 1 | 1 | 0 | 0 | 0 | 1 |
| Enable pixel | 0 | 0 | 0 | 0 | 1 | 0 | 0 | 1 | 1 | 0 | 0 | 0 | 1 |
| Disable pixel | 0 | 0 | 0 | 0 | 0 | 0 | 1 | 0 | 1 | 0 | 0 | 0 | 0 |
| Enable pixel | 1 | 1 | 0 | 0 | 1 | 0 | 0 | 1 | 1 | 0 | 0 | 1 | 1 |
| Disable pixel | 0 | 0 | 1 | 0 | 0 | 0 | 1 | 0 | 0 | 1 | 0 | 0 | 0 |
| Enable pixel | 1 | 0 | 1 | 0 | 0 | 0 | 0 | 1 | 0 | 1 | 0 | 1 | 1 |
| Enable pixel | 0 | 1 | 0 | 0 | 1 | 0 | 1 | 0 | 0 | 1 | 0 | 0 | 1 |
| Disable pixel | 1 | 1 | 1 | 0 | 0 | 0 | 0 | 1 | 0 | 0 | 0 | 0 | 0 |
| Enable pixel | 1 | 0 | 1 | 1 | 0 | 0 | 1 | 0 | 0 | 0 | 0 | 1 | 1 |
| Disable pixel | 1 | 0 | 1 | 0 | 0 | 0 | 1 | 1 | 0 | 0 | 0 | 0 | 0 |
| Disable pixel | 0 | 0 | 0 | 0 | 0 | 0 | 0 | 0 | 0 | 0 | 0 | 0 | 0 |
| Enable pixel | 0 | 0 | 0 | 0 | 0 | 0 | 0 | 0 | 0 | 0 | 0 | 1 | 1 |
| Enable pixel | 1 | 0 | 0 | 1 | 0 | 1 | 1 | 0 | 1 | 0 | 1 | 0 | 1 |
| Enable pixel | 1 | 1 | 1 | 0 | 0 | 0 | 0 | 1 | 0 | 0 | 0 | 0 | 1 |
| Enable pixel | 0 | 0 | 0 | 0 | 0 | 0 | 1 | 0 | 0 | 0 | 1 | 0 | 1 |
| Disable pixel | 1 | 1 | 0 | 0 | 0 | 0 | 0 | 1 | 0 | 0 | 0 | 0 | 0 |
| Disable pixel | 0 | 0 | 0 | 1 | 0 | 1 | 1 | 0 | 0 | 0 | 0 | 0 | 0 |
| Disable pixel | 1 | 0 | 0 | 0 | 0 | 0 | 0 | 1 | 0 | 0 | 0 | 1 | 0 |
| Disable pixel | 0 | 1 | 0 | 0 | 0 | 0 | 1 | 0 | 0 | 0 | 0 | 0 | 0 |
| Disable pixel | 1 | 0 | 0 | 0 | 0 | 0 | 0 | 1 | 0 | 0 | 0 | 0 | 0 |
| Disable pixel | 0 | 0 | 0 | 0 | 1 | 1 | 0 | 0 | 0 | 0 | 0 | 0 | 0 |
| Disable pixel | 0 | 1 | 0 | 0 | 0 | 0 | 1 | 0 | 0 | 0 | 0 | 1 | 0 |
| Disable pixel | 0 | 0 | 0 | 1 | 0 | 1 | 0 | 1 | 0 | 0 | 1 | 0 | 0 |
| Disable pixel | 1 | 0 | 0 | 0 | 0 | 0 | 0 | 0 | 0 | 0 | 1 | 0 | 0 |
| Disable pixel | 0 | 1 | 0 | 1 | 0 | 0 | 1 | 0 | 0 | 0 | 0 | 0 | 0 |
| Disable pixel | 1 | 0 | 0 | 0 | 1 | 0 | 0 | 1 | 1 | 0 | 0 | 0 | 0 |

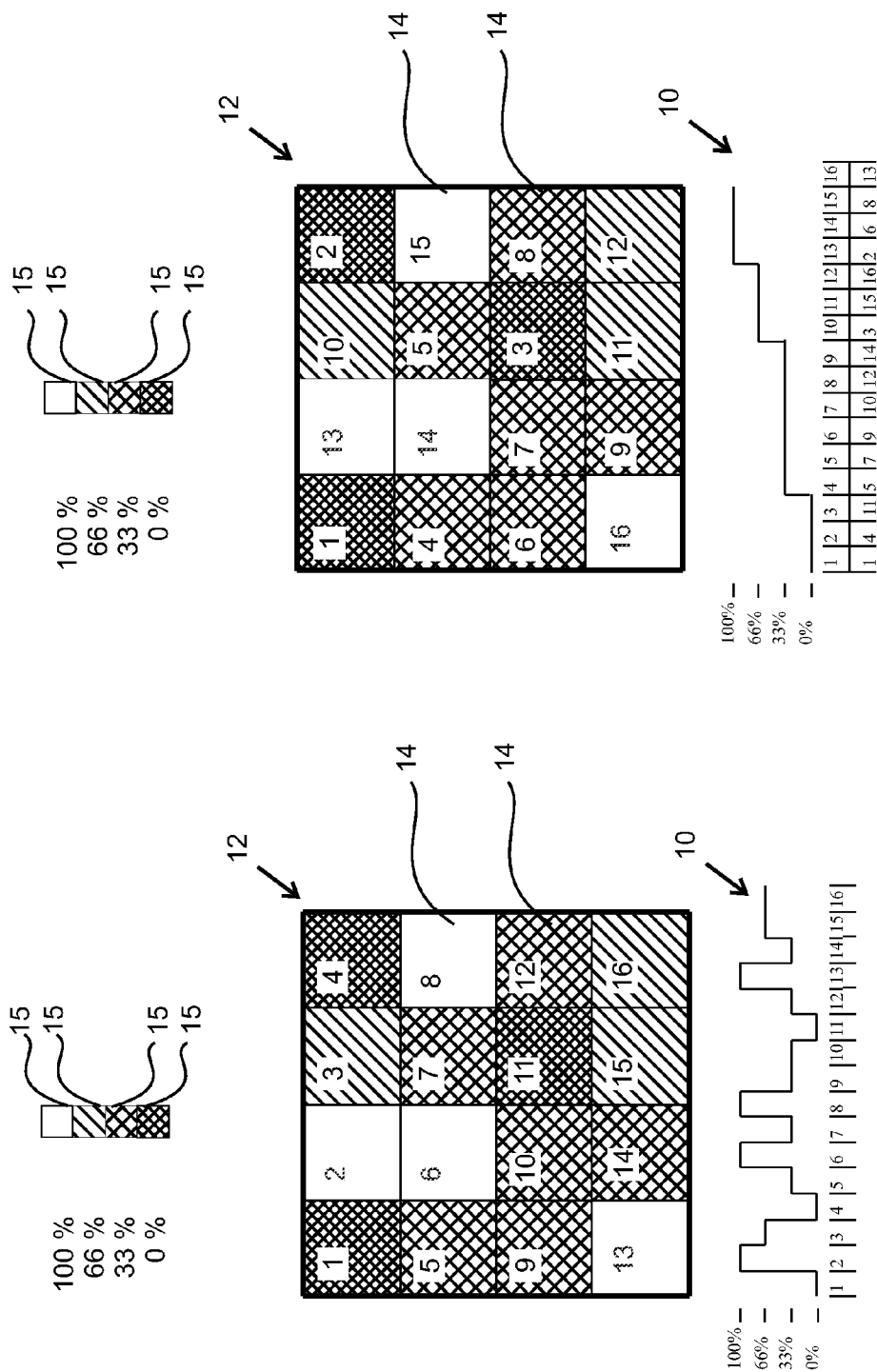

BACKPLANE DEVICE

CROSS REFERENCE TO RELATED APPLICATIONS

This application claims the priority of PCT/EP2011/065086, filed on Sep. 1, 2011, which claims priority to European Application No. 10174976.0, filed Sep. 1, 2010; European Application No. 11170254.4, filed Jun. 16, 2011, and European Application No. 11178551.5, filed Aug. 23, 2011, the entire contents of all of which are hereby incorporated in total by reference.

BACKGROUND OF THE INVENTION

The present invention relates to a backplane device for a light source array or for a light source matrix as well as a method of driving a backplane for a light source array or for a light source matrix. In particular, the present invention relates to a backplane device for an array or matrix of light sources being LEDs (Light Emitting Diodes) or OLEDs (Organic Light Emitting Diodes), which can be used for a display being suitable to display two-dimensional or three-dimensional information, images and scenes and video sequences. Backplane devices with an array or matrix of light sources being LEDs or OLEDs might be applied in particular for holographic display applications, e.g. like they are disclosed in WO 2006/066919 A1, which is incorporated by reference herewith. For such applications, a high frame rate might be needed, especially because virtual observer windows (VOW) might have to be generated in a time sequential manner for one or more observers. The backplane device according to the present invention can also be applied for a display being suitable to display three-dimensional information, images and scenes and video sequences in a stereoscopic or an autostereoscopic display.

OLEDs are used in television screens, computer monitors, small portable system screens such as mobile phones and PDAs, watches, advertising, information and indication. Due to their comparatively early stage of development, they typically emit less light per unit area than inorganic solid-state based LEDs similarly designed for use as point-light sources.

An OLED display functions without a backlight and so can display deep black levels and can be thinner and lighter than established liquid crystal displays. Similarly, in conditions of low ambient light such as dark rooms, an OLED screen can achieve a higher contrast ratio than either a LCD screen using cold cathode fluorescent lamps or the more recently developed LED backlight.

OLED displays can use either passive-matrix or active-matrix addressing schemes. Active-matrix OLEDs (AMOLED) require a thin-film transistor backplane to switch each individual pixel on or off, and can make higher resolution and larger size displays possible. In particular, the present invention relates to an AMOLED backplane device, e.g. especially an electric circuitry for driving and/or controlling an array or a matrix of OLEDs.

During operation, a voltage is applied across the OLED such that the anode is positive with respect to the cathode. A current of electrons flows through the device from cathode to anode, as electrons are injected into the lowest unoccupied molecular orbitals (LUMO) of the organic layer at the cathode and withdrawn from the highest occupied molecular orbitals (HOMO) at the anode. This latter process may also be described as the injection of electron holes into the HOMO. Electrostatic forces bring the electrons and the holes towards each other and they recombine forming an exciton, a bound state of the electron and hole. This happens closer to the emissive layer, because in organic semiconductors holes are generally more mobile than electrons. The decay of this excited state results in a relaxation of the energy levels of the electron, accompanied by emission of radiation whose frequency is in the visible region. The frequency of this radiation depends on the band gap of the material, in this case the difference in energy between the HOMO and LUMO.

For a high resolution display like a TV, a TFT backplane is necessary to drive the pixels correctly. Currently, Low Temperature Polycrystalline silicon LTPS-TFT is used for commercial AMOLED displays. LTPS-TFT has variation of the performance in a display, so various compensation circuits have been developed. Due to the size limitation of the excimer laser used for LTPS, the AMOLED size was limited. To cope with the hurdle related to the panel size, amorphous-silicon/microcrystalline-silicon backplanes have been reported with large display prototype demonstrations.

TFT backplane technology is a crucial enabler for the fabrication of flexible AMOLED displays. Two primary TFT backplane technologies (poly-Silicon (poly-Si) and amorphous-Silicon (a-Si)) are used today in AMOLEDs. These technologies offer the potential for fabricating the required active matrix backplanes at low temperatures (<150° C.) directly on the flexible plastic substrate for producing flexible AMOLED displays.

Passive-matrix OLED displays are now being used e.g. in mobile telephones. While conventional passive-matrix addressing simplifies the display fabrication, the number of rows is limited to a few hundred. Since the OLED is on only when being addressed, high peak currents are required to obtain average brightness levels. Row line resistance, column line resistance, and various OLED electrical characteristics restrict display luminance, size, format, and efficiency. However, for very-high-information-content displays, the cost of these approaches is likely to be prohibitive.

Thin-film-transistor (TFT) active-matrix backplanes can virtually eliminate the limitations of display content, size, format, luminance, and efficiency. Large-area high-resolution AMOLED TFT displays are being demonstrated with active-matrix TFT backplanes. One of the largest AMOLED display demonstrated to date, for example, uses a-Si TFT backplanes to achieve 20-inch diagonal HDTV formats with peak brightness (>500 $cd/m^2$), with an efficiency >20 cd/A NTSC white. TFT active-matrix backplanes were initially developed for making large-sized and high resolution liquid-crystal displays (LCDs). The pixel circuit simply consists of a TFT connected to a storage capacitor and the pixel LC electrode. The impedance of the liquid crystal materials used is that of a capacitor whose value varies as a function of applied voltage as the refractive index changes. TFT performance is sufficient to stabilize the storage-capacitor voltage and LC voltage within a row time. The percentage of time that the pixel TFT is on and conducts is very low (~0.1-1%). Applied data and LC voltages alternate polarity from frame to frame to avoid image sticking due to ion plating in the LC. The alternating data voltages and low duty factor on times tend to stabilize transistor characteristics such as threshold voltage for long operating lifetimes in AMLCDs.

Driving OLEDs uniformly with TFTs is more challenging than driving liquid crystal. The main reasons are (1) OLED current-dependent luminance or brightness, (2) large TFT dimensions with high gate-to-drain capacitance ($C_{gd}$) and gate-to-source capacitance ($C_{gs}$), and (3) threshold voltage and mobility variations. The drive TFT should provide a continuous current over a large portion of the frame time to efficiently drive the OLED to desired luminance levels. The pixel area limits the number of TFTs and their widths, which is directly proportional to TFT transconductance. As a result, the OLED driving TFT transconductance can be limited. The electron mobility ($\mu$) of low-temperature polysilicon (LTPS) can be one to two orders of magnitude higher than that of amorphous-silicon (a-Si). As a consequence, LTPS TFT widths can be smaller, with possibilities of allowing for more TFTs in the pixel area for additional error correction. In addition, the LTPS TFT on-resistance may be lower, yielding better power-efficient operation. As a result of high gate capacitances, TFT on/off switching can create large voltage offsets. Thus, offset correction is required. OLED characteristics change with temperature rise caused by drive currents. This can result in luminance that depends upon the previous state. Pixel-to-pixel variations in Vt (threshold-voltage) and electron mobility p also add to unwanted luminance variations. With LTPS, initial Vt and mobility variations exist due to grain size and boundary variations. In contrast, in most a-Si processes, the initial Vt and p are uniform within a backplane. While time-related electrical stress may produce large Vt variations, there is typically little deviation in mobility. Optimized AC terminal voltages help to minimize time-related electrical stress variations.

Various techniques have been employed to minimize the impact of TFT variations with the use of simple pixel circuits. For example, restricting the use of an AMOLED display to video can assure that all pixels experience the same electrical stress. In one method, to obtain gray-level images, the bits are sequentially written with binary-weighted timing to the array. This requires a custom-designed frame buffer. In another method, the binary data bits are decoded to drive separate subpixel OLEDs. A lower cost solution is to send analog data to the pixel circuit and to have the driving method compensate for the Vt and electron mobility $\mu$ variations in the OLED driving TFT. Due to its inherent lower manufacturing cost, a-Si backplanes for driving OLEDs is of interest. Emphasis on lower cost also creates a need for simpler voltage-data circuits along with simpler driving methods.

SUMMARY OF THE INVENTION

It is therefore an object of the present invention to overcome at least one drawback mentioned above, especially in providing a simpler driving method.

The above mentioned problem is solved by a backplane device for a light source matrix. A light source might comprise a LED or an OLED. A pixel circuitry of the backplane device is assigned to a light source of the light source matrix for controlling the light source. One light source and one pixel circuitry constitute a pixel. The pixels of the light source matrix or of a cluster of the light source matrix are classified according to a pixel characteristic. The order of switching the light sources on and/or off depends on the pixel characteristic and not necessarily on the location of the pixel on the backplane device. A current being applied to the light sources is controlled by at least one driver. The at least one driver is electrically connectable to at least one pixel and the at least one driver is not belonging to the pixel circuitry of the pixel.

A light source matrix according the present invention especially can be a two-dimensionally matrix of light sources being arranged in a predeterminable way, especially in a regular array. Alternatively, it can be a one-dimensionally matrix or array of light sources. The term "current characteristic" in the sense of the present invention is to be understood as a current function which might comprise a constant current value for a certain period of time but which also might be variable for a certain period of time. The term "assigning a pixel value to a pixel" with regard to the present invention it is especially to be understood that a current is applied to the light source of the pixel, resulting in a current flow through the light source of the pixel. Such a pixel value causes a pixel of the light source matrix to represent for example a brightness value or a colour value, depending on the kind of light source matrix to be operated by the backplane according to the invention.

Instead of following the pixel addressing scheme of the backplane devices of the prior art, for example active matrix backplanes, wherein the single pixels of the backplane device are addressed subsequently row by row and within an addressed row either simultaneously or pixel by pixel, the present invention uses a completely different pixel addressing scheme. The pixels of the light source matrix or of a cluster of the light source matrix are classified according to a pixel characteristic. Such a pixel characteristic might e.g. be the pixel value to be assigned to the pixel, in other words the brightness of the pixel. Other examples for pixel characteristics are given below. The order of switching the light sources on and/or off then depends on the pixel characteristic and not necessarily on the location of the pixel on the backplane device. Depending on the information or the image to be displayed with the light source matrix, the single pixels of the light source matrix can be addressed or activated and/or deactivated in a random access manner rather than row by row and pixel by pixel. Especially in a light source matrix according to the prior art comprising an active matrix backplane and OLEDs as light sources, the value of the electric current to be applied to a single light source is usually stored as an analog value in the circuit of the pixel of this single light source. However, this part of the pixel circuit might be regarded as a driver portion of the pixel being responsible for controlling the current to flow through the light source of that pixel. The present backplane device is different from that approach in that the current being applied to the light sources is controlled by at least one driver which is electrically connectable to at least one pixel but which is not belonging to the pixel circuitry of the pixel. Therefore, the pixel circuitry of a pixel is less complex and does not need to be adapted to store an analog signal. The pixel circuitry of a pixel does not include a driver portion being responsible for controlling the amount of current to flow through the light source of that pixel. The pixel addressing is therefore depending on the pixel characteristic, e.g. the pixel value to be assigned to the pixels, preventing having high current value changes at very high frequencies on the common analog line being used in prior art systems, where—depending on the pixel values to be assigned to the pixels—for example in one pixel the pixel value of a small current and in the next pixel the maximal current has to be assigned to within two clock cycles. According to the present invention, it is attempted to rather have a current characteristic or current function being applied to an analog line comprising smaller current value changes at a lower frequency. This might be achieved by applying for example a ramp function as the current characteristic to the analog line. The single pixels then are addressed depending on the current characteristic being applied to the analog line and especially depending on the actual current value being applied to the analog line. In other words, a particular pixel is being addressed at the time when the current value of the current characteristic corresponding to the pixel value to be assigned to this particular pixel is applied on the analog line. Therefore, a high frequency current characteristic (at least with respect of the pixel clock range) being applied to the analog line can be prevented and a rather smooth or lower frequency current characteristic is applied to the analog line. In order to do that, it is necessary to make the addressing of the pixels in dependence of the pixel characteristic being applied to the analog line, which might lead to a pixel addressing being similar to a random access. This most likely will result in high frequency signals being applied to addressing lines of the pixel circuitries. However, this then relates to the digital addressing circuits—not the analog line circuit where higher currents or voltages can be applied—where digital signals of the same (low) voltages are applied.

For high resolution displays, it is helpful to have smaller transistor and line structure sizes to have a high the pixel aperture. This will reduce possible maximal drive currents. Contrary to this, state of the art displays need higher currents to achieve faster transfer times to keep the frame rate despite the increased number of lines. Reducing the transistor structure size also reduces the transistor gate capacity. The present invention profits from smaller structure sizes, because the smaller gate capacities allow higher transistor switching frequencies, lower voltage levels and lower currents. The lower voltages and lower currents result in a reduced power dissipation compared to state of the art implementations.

A pixel value to be assigned to a pixel might depend on the current to be applied to the light source of the pixel. The higher the current value is, the brighter the light source of the pixel will be. Alternatively or additionally, the pixel value to be assigned to a pixel might depend on the duration for which current is applied to the light source of the pixel. For example, if there is an average enablement duration for every pixel, then a lower pixel value can be assigned to a pixel by controlling this pixel such that its enablement duration is shorter than the average enablement duration for every pixel. The shorter the enablement duration of this pixel is the lower pixel value is represented by this pixel. In case there is a blank time after such an average enablement duration for every pixel, then a higher pixel value can be assigned to a pixel by controlling this pixel such that its enablement duration is longer than the average enablement duration for every pixel and extending into the blank time.

The light source, especially an OLED, might comprise a threshold value or a flux voltage. The threshold value of such a light source might be regarded as a pixel characteristic. Therefore, in a preferred embodiment of the present invention and as the classification of a particular pixel characteristic, the threshold values of all light sources of the light source matrix are measured (e.g. in an initial calibration step during production of the light source matrix), the threshold values of the light sources could be sorted from the lowest (highest) to the highest (lowest) threshold value and the threshold values are stored together with the addresses of the respective pixels. Then the order of switching the light sources on and/or off—and therefore influencing the order of addressing the pixels of the light source matrix—depends on this particular pixel characteristic, i.e. the threshold values of all light sources of the light source matrix, and not necessarily on the location of the pixel on the backplane device.

According to another preferred embodiment of the present invention and as another classification of a particular pixel characteristic, the pixel characteristic might be the brightness or the current value with which the light source of the pixel is to be operated. In case all light sources, and especially in case all OLEDs, comprise nearly the same current-brightness response curve (or characteristic curve), the current value to be applied to a pixel of the light source matrix directly relates to the brightness of the light source of this pixel and therefore to the pixel value which is to be assigned to this pixel. In such a case, the order of switching the light sources on and/or off then depends on this particular pixel characteristic, i.e. the brightness of the light sources to be applied or the current value to flow through the light sources of the light source matrix. In case the current-brightness response curve of the light sources of the light source matrix differ from each other, then this particular pixel characteristic might be applied as well, however, a calibration step might have to be introduced to measure and store the result of such a measurement of the current-brightness response curve of the light sources of the light source matrix. The different current-brightness response curves of the light sources of the light source matrix then might have an influence on the order of addressing the pixels.

In a preferred embodiment, the light source of the pixel is to be operated for a pre-determinable time period. This could be realized once the order of switching the light sources on according to a particular pixel characteristic has been determined and is respectively carried out in this way, then—for example in dependence on the pixel value or the brightness of the light source of a pixel to be applied—the light sources of the pixels are operated for a pre-determinable time period. In this embodiment, the light source of a pixel would therefore be enabled or operated for a longer time period and therefore would appear to have a brighter value than another pixel having a lower brightness and therefore a lower pixel value because it is operated for a shorter time period. In such an embodiment, the current to be applied to the light sources of all pixels of the light source matrix could comprise essentially the same current value. Therefore, the duration of operation of the light sources of the pixels determines the pixel values to be displayed by the pixels.

Preferably, an addressing of the pixels for an enablement and/or a disablement of the pixels is carried out essentially for the pixels comprising the same pixel characteristics. The addressing of the pixels comprising the same pixel value can be performed in temporal proximity to each other in one operation mode of the backplane device. This can particularly be applied, if the current characteristic comprises a ramp up and/or a ramp down function, as explained below. In another preferred operation mode of the backplane device, the addressing of all pixels to which the same pixel value is assigned is performed at essentially the same time. Such an operation mode of the backplane device could be applied, if a lot of or all pixels have to be assigned to the same pixel value or if the pixel values of a lot of or all pixels have to be reset to a predetermined pixel value. In still another operation mode of the backplane device, the addressing of all pixels to which the same pixel value is assigned is performed in a period of time. This operation mode of the backplane device could especially be applied, if at a time a pixel value is assigned to only one pixel. Then, in case 5 pixels need to be assigned the same pixel value, this operation takes 5 pixel writing cycles being the period of time, because at a time a pixel value is assigned to only one pixel.

The at least one driver of the backplane device could be adapted such that the current flowing through a light source comprises essentially a constant value, especially during a pre-determinable time period in which the pixel is activated. In such an embodiment, the light source of a particular pixel is controlled comparable to a pulse width modulation mode and/or the current being applied to a pixel essentially comprises a square function, wherein if the light source of a pixel is enabled and therefore current flows through this light source, the current value is—maybe after a short time after enablement—essentially constant during this operation time. Such an operation mode could be applied to some pixels or light sources of the light source matrix. Alternatively, all pixels or light sources of the light source matrix could be controlled that way. If all pixels of the light source matrix are driven with essentially the same constant current value then the different brightness values or pixel values of the pixels are achieved by different time periods in which the single pixels are activated/enabled.

A current characteristic could be applied to pre-determinable light sources of the light source matrix. The current characteristic might be a current ramp up function or a current ramp down function. Preferably a combination of both is applied, i.e. a current ramp up function is applied which is followed by a current ramp down function. Alternatively or additionally a saw-tooth like function can be applied. Such a saw tooth like function can comprise a steep rising edge and a slowly decreasing characteristic or a slowly increasing characteristic followed by a steep falling edge or a slowly increasing characteristic followed by a slowly decreasing characteristic. Usually, a light source is driven at a pre-determinable current value for a pre-determinable activation time for achieving a certain brightness of the light source. Such a pre-determinable current value is usually located in a limited range between a minimal and a maximal operation current of the light source. The current characteristic could comprise a higher current value for a shorter predetermined activation time compared to the usual driving properties of the light sources. Alternatively or additionally, the current characteristic could comprise a lower current value for a longer predetermined activation time compared to the usual driving properties of the light sources. Such a higher or lower current value can be applied in combination with the other current characteristics mentioned above, especially whenever it is appropriate.

Usually, the current characteristic is variable in time and has predominantly the characteristic of a mathematically monotonic function or series. This does not mean that the current characteristic might not comprise single steep rising or falling edges. However, after the occurrence of a single steep rising or falling edge, the subsequent current characteristic usually has predominantly the characteristic of a mathematically monotonic function or series. In particular, the current characteristic might be monotonic increasing or monotonic decreasing. In general, the current characteristic can be any current profile or current flow which might be necessary to be carried out for a particular application or for a particular content to be displayed with the light source matrix.

According to particular preferred embodiment of the present invention, the generated current characteristic being applied to the at least one analog line determines the order of addressing of the pixels. If, for example, the generated current characteristic being applied to the at least one analog line comprises a ramp up function starting with low current values and increasing to high current values, then the pixels to which a high pixel value needs to be assigned (because the pixel value to be assigned to this pixel corresponds to the duration of activation) will be addressed first. When the current value of the ramp up function is increased to another current value, then one or more pixels to which a lower pixel value is to be assigned are addressed, such that this next lower current value is assigned to the one or to these more pixels. However, these pixels are operated for a shorter time period and thus appear to comprise a lower brightness than pixels which have been enabled before.

Because now more pixels are enabled—e.g. current of about the same current value flows through the enabled pixels—the total current to be applied to the pixels needs to increase (e.g. by a ramp up function for the current value). Even though there is no particular order of addressing pixels when the same pixel value is assigned to a plurality of pixels, according to this embodiment of the invention there is an order of the addressing of the pixels with respect to different current values and therefore pixel values to be assigned to the pixels.

In one preferred embodiment of the invention, the pixel addresses being determined are generated for the x-direction and for the y-direction. The assignment of a pixel value to a pixel is carried out in a random access manner with respect to the x-direction and to the y-direction. This might especially be the case, if the current characteristic is not determined depending on the pixel values to be assigned to the pixels and therefore the current characteristic might be a generated periodic function, e.g. a sin-function or a ramp up and/or a ramp down function comprising essentially a straight linear increasing/decreasing characteristic or a step like function. Therefore, there is not by definition a particular order of addressing the pixels, i.e. like in the prior art, where subsequently each row of the backplane is addressed. Even though, this might be the case according to the addressing scheme of the present invention in a particular situation, for instance when adjacent rows of pixels should be assigned to slightly increasing pixel values and within a row, the pixel value is constant, this is not in general the case. In contrast to the prior art addressing scheme, the addressing scheme and therefore the assignment of a pixel value to a pixel according to this embodiment of the present invention might be carried out in a random access manner. Therefore, there is no fixed row cycle or even frame cycle applied because of the random access manner of addressing the pixels.

According to a preferred embodiment of the present invention, the backplane device might comprise at least one enable line and/or at least one analog line. Every pixel circuitry is connected to an enable line and/or to an analog line. In this embodiment, the current will be provided via the analog line to each pixel circuitry to which the analog line is connected to. With the help of the enable line being connected to a pixel circuitry, the actual enablement or disablement of the light source of this pixel circuitry is carried out when this pixel is addressed by bringing the transfer TFT (also called driver TFT)—the transfer TFT being the TFT of the pixel circuitry being responsible to switch a current flow between a current source via the analog line through the light source of this pixel and to the ground—in an electrical conductive or in an non-conductive mode. The backplane device is preferably adapted such that the generated current characteristic is applied to the at least one analog line for the purpose of assigning the pixels value to the pixels.

The backplane device might comprise at least one pixel addressing means, wherein such a pixel addressing means comprises x-addressing lines and y-addressing lines. Every pixel circuitry is connected to an x-addressing line and to a y-addressing line. The pixel addressing means might comprise at least one x-address decoder and at least one y-address decoder. The x-address decoder is connected to the x-addressing lines and the y-address decoder is connected to the y-addressing lines.

The address decoder comprises logical circuits which perform the enablement of single or all addressing lines. The x-address decoder and/or the y-address decoder could be based on a Dynamic NOR-decoder and/or could be based on a Dynamic NAND-decoder and/or could be based on an OR-decoder and/or could be based on a CMOS-Decoder (especially at LTPS) comprising a NAND and NOR circuit and/or could be based on an AND-decoder.

Depending on the kind of light source matrix and the application which is intended to be realized with it, the x-address decoder and/or the y-address decoder could be arranged at various positions on or relative to the backplane device. The x-address decoder and/or the y-address decoder could be arranged separately from the backplane device, e.g. on a separate board. Alternatively, the x-address decoder and/or the y-address decoder could be located at the outside edge of the backplane device. A further alternative could be to locate the x-address decoder and/or the y-address decoder on the backplane device between the pixels.

The terms TFT and transistors are interchangeable in the description and claims meaning that all transistors can be made from TFTs and all TFTs can be replaced by other types of transistors or other actively switching elements, made for instance from single-crystal silicon or other semiconductor material.

In the following, different possibilities to carry out the control circuit of a pixel (pixel circuitry) of a backplane device are described. It is noted that usually all pixels of the light source matrix or the backplane device comprise the same control circuit, however, it might be possible to have different control circuits for pixels being applied at a light source matrix or the backplane device.

In a first embodiment, a pixel circuitry could comprise three TFTs. The first TFT is connected to the enable line, to an y-addressing line and to the second TFT. The second TFT is connected to the first TFT, to a x-addressing line and to the third TFT. The third TFT is connected to the second TFT. The third TFT is adapted to switch or to provide an electrical connection between the analog line through the light source of the pixel to the ground. The third TFT of such a pixel circuitry (as well as of the pixel circuitries of the following two embodiments) can also be regarded as a transfer TFT, because it is adapted to enable or to disable the flow of current through the light source of a pixel and therefore the transfer of charges between the analog line and the ground through the light source of the pixel.

In a second embodiment, a pixel circuitry could comprise three TFTs. For two pixels being located adjacent to each other and being addressed by the same y-addressing line, the first TFT of the first pixel is—as an enabling function—connected to the x-addressing line of the second pixel, to the y-addressing line and to the second TFT of the first pixel. The second TFT of the first pixel is connected to the first TFT of the first pixel, to an x-addressing line of the first pixel and to the third TFT of the first pixel. The third TFT of the first pixel is connected to the second TFT of the first pixel. The third TFT of the first pixel is adapted to switch an electrical connection between the analog line through the light source of the first pixel to the ground. The first TFT of the second pixel is—as an enabling function—connected to the x-addressing line of the first pixel, to the y-addressing line and to the second TFT of the second pixel. The second TFT of the second pixel is connected to the first TFT of the second pixel, to an x-addressing line of the second pixel and to the third TFT of the second pixel. The third TFT of the second pixel is connected to the second TFT of the second pixel. The third TFT of the second pixel is adapted to switch an electrical connection between the analog line through the light source of the second pixel to the ground.

In a third embodiment, a pixel circuitry could comprise three TFTs. For four pixels being located adjacent to each other and being addressed by the same y-addressing line, the first TFT of the first pixel is—as an enabling function—connected to the x-addressing line of the third pixel, to the y-addressing line and to the second TFT of the first pixel. The second TFT of the first pixel is connected to the first TFT of the first pixel, to an x-addressing line of the first pixel and to the third TFT of the first pixel. The third TFT of the first pixel is connected to the second TFT of the first pixel. The third TFT of the first pixel is adapted to switch an electrical connection between the analog line through the light source of the first pixel to the ground. The first TFT of the second pixel is—as an enabling function—connected to the x-addressing line of the first pixel, to the y-addressing line and to the second TFT of the second pixel. The second TFT of the second pixel is connected to the first TFT of the second pixel, to an x-addressing line of the second pixel and to the third TFT of the second pixel. The third TFT of the second pixel is connected to the second TFT of the second pixel. The third TFT of the second pixel is adapted to switch an electrical connection between the analog line through the light source of the second pixel to the ground. The first TFT of the third pixel is—as an enabling function—connected to the x-addressing line of the fourth pixel, to the y-addressing line and to the second TFT of the third pixel. The second TFT of the third pixel is connected to the first TFT of the third pixel, to an x-addressing line of the third pixel and to the third TFT of the third pixel. The third TFT of the third pixel is connected to the second TFT of the third pixel. The third TFT of the third pixel is adapted to switch an electrical connection between the analog line through the light source of the third pixel to the ground. The first TFT of the fourth pixel is—as an enabling function—connected to the x-addressing line of the second pixel, to the y-addressing line and to the second TFT of the fourth pixel. The second TFT of the fourth pixel is connected to the first TFT of the fourth pixel, to an x-addressing line of the fourth pixel and to the third TFT of the fourth pixel. The third TFT of the fourth pixel is connected to the second TFT of the fourth pixel. The third TFT of the fourth pixel is adapted to switch an electrical connection between the analog line through the light source of the fourth pixel to the ground.

Even though above TFT or transistor elements are mentioned, other circuits and/or other switching elements can be used or applied for the backplane device instead, the other circuits and/or other switching elements actively realising the function of the transfer and selection transistors or of the first, second and third TFT.

It might be advantageous that the first TFT of a pixel and the second TFT of the same pixel are combined into a dual gate TFT, resulting in a further simplicity of the pixel circuitry, comprising lower leakage current and saving space. This might be done for the three embodiments mentioned above.

Even though in principle a lot of possibilities do exist for the connection of the gate, source and drain of a TFT, however, in the following, the most preferred ways of connecting the TFTs of the three embodiments mentioned above are described. These ways of connection might also be combined with each other.

An x-addressing line or a y-addressing line could be connected with the gate of the first TFT of a pixel or with the gate of the second TFT of the pixel or with the gates of the dual gate TFT according to claim 19.

An enable line or the x-addressing line serving as an enable line could be connected with the source of the first TFT of a pixel. Alternatively or additionally the drain of the first TFT of a pixel could be connected to the source of the second TFT of the same pixel. Furthermore, the drain of the second TFT of a pixel could be connected to the gate of the third TFT of the same pixel.

The analog line could be connected to the source of the third TFT of a pixel and the light source of the same pixel being connected to the ground could be connected with the drain of the third TFT of the same pixel. Alternatively, the analog line being connected to the light source of a pixel could be connected to the source of the third TFT of the same pixel and the ground is connected with the drain of the third TFT of the same pixel. In other words, the light source could be located on either side of the third TFT, as long as the third TFT enables or disables a current flow between the current source through the analog line through the light source of the pixel to the ground.

According to a preferred embodiment, the backplane device comprises a pixel measurement scheme including a measurement function of a pixel and/or a pixel circuitry preferably being applied during a predetermined time period. Such a pixel measurement scheme could be applied for a partial time of a frame time. The pixel measurement of a pixel is carried out with the help of the at least one driver being connected to the pixel. With such a pixel measurement scheme it is possible to measure characteristics of single elements of a pixel circuitry and/or of the light source of such a pixel. The result of such a measurement can be stored and it that can be regarded for the controlling of such a pixel in the future. Such a measurement can be repeated for a pixel.

Such a measurement function could be carried out in the following way: the gate of the transfer transistor (third TFT of a pixel) of a pixel circuitry is connected to the enable line by addressing the x-addressing line and the y-addressing line of the pixel. A variable voltage function is applied on the enable line. The variable voltage function comprises applying increasing or decreasing voltage values from a first voltage value—e.g. 0V—to a second voltage value—e.g. Vmax. A measuring means is adapted to measure, at which voltage value of the variable voltage function a current flows or does not flow any more between the analog line through the light source of the pixel to the ground. With the help of this measurement function it is possible to measure the gate bias stress of the transfer transistor which influences the threshold voltage of the pixel circuitry.

Alternatively or additionally, another measurement function could be carried our in the following way: the pixel circuitry of a pixel is addressed by the addressing means such that a current flow from the analog line through the light source of that pixel to ground is enabled. A current function is applied on the analog line. The current function comprises applying increasing or decreasing current values from a first current value—e.g. 0 mA—to a second current value—e.g. Imax. A measuring means measures the actual current flowing between the analog line through the light source of the pixel to the ground. By these means, the threshold value or flux voltage of the light source of the pixel, especially when the light source of the pixel is an OLED, can be measured. It is noted, that these two examples of measurement functions can be carried out without adding further elements to a pixel circuitry. Instead, further elements exist or need to be added e.g. to the driver of the backplane device for providing the functionality of this specific measurement function.

According to a preferred embodiment of the inventive backplane device, the backplane device comprises a circuitry being made of a-Si or a-Oxide or poly-Si or organic electronic material. It might be possible to print the necessary organic electronic material onto a layer to provide a part of the backplane device.

According to a preferred embodiment of the invention, the light source matrix and/or the backplane device comprises a cluster arrangement of at least two clusters of pixels. Each cluster comprises an analog line and a pixel addressing means for addressing the pixels of the cluster. The analog line of each cluster is connected between the cluster itself and an external current source, e.g. of a driver means of the backplane device.

Preferably, the clusters are controlled independently from each other. Therefore, the pixel values for a particular cluster are assigned to the pixels of this particular cluster by the addressing means and the analog line of this particular cluster, while pixel values for another cluster are assigned to the pixels of this other cluster by the addressing means and the analog line of this other cluster independently either at the same time or shifted in time. Cases of suitable clusters for different applications might be of a square shape and might comprise 64×64 pixels, 128×128 pixels, 256×256 pixels or 1024×1024 pixels. The term "cluster" in the sense of the present invention especially means that a plurality of pixels are arranged and therefore form a connected or a contiguous region of the light source matrix. Such a region might have a rectangular shape, a square shape or a honeycomb shape. Preferably, a cluster does not extend over a full width or a full length of the light source matrix. The number of pixels of a cluster in the x- or in the y-direction does not need to be $2^n$, n being a natural number.

A light source matrix comprising a backplane device according to the claimed invention can be used advantageously for a display device for generating a two-dimensional and/or three-dimensional representation of a scene or of content. Furthermore, a display device for generating a two-dimensional and/or three-dimensional representation of a scene, and especially a stereoscopic or holographic display device, could comprise a backplane device according to the claimed invention or could comprise the light source matrix according to the claims.

Such a light source matrix and/or such a display device comprising a light source matrix including the inventive backplane device comprises the advantages of high image quality being superior to LCD displays. Therefore, such a display device results in an excellent black level, delivering a high contrast, comprising short response times and therefore having a reduced motion blur and a high color gamut for creating natural images. Such a display device does not need an extra backlight unit and if different light sources for different emitting wavelengths of light (color) are used, there is no need for having color filters, such that the number of optical films can advantageously be reduced.

The above mentioned problem is solved by the present invention as defined by the the claims by a method for operating a backplane device for a light source matrix. A pixel circuitry of the backplane device being assigned to a light source of the light source matrix is used for controlling the light source. One light source and one pixel circuitry constitute a pixel. The pixels of the light source matrix or of a cluster of the light source matrix are classified according to a pixel characteristic. The order of switching the light sources on and/or off depends on the pixel characteristic and not necessarily on the location of the pixel on the backplane device. A current being applied to the light sources is controlled by at least one driver. The at least one driver is electrically connectable to at least one pixel and the at least one driver is not belonging to the pixel circuitry of the pixel. A light source is preferably a LED or an OLED.

The method according to the invention is particularly designed to operate the backplane device according to the claimed invention. In the knowledge of the backplane device according to the claimed invention, a person skilled in the art is suggested to methods and variations thereof to operate the backplane device according to the claimed invention. Therefore, reference is made to the description made above for the sake of preventing repetitions.

In a particularly preferred embodiment, a backplane device for a light source array or for a light source matrix is provided, especially a light source matrix in a display device for generating a two-dimensional and/or three-dimensional representation of a scene or of content. The light source matrix comprises pixels having pixel addresses and being electronically controllable by the backplane device for assigning pixel values to the pixels. The backplane device comprises at least one light source for each pixel, at least one analog line and at least one pixel addressing means. Such a pixel addressing means comprises x-addressing lines and y-addressing lines. Every pixel is connected to an analog line, to an x-addressing line and to a y-addressing line. As a pixel value assigning scheme a generating means is adapted to generate a current characteristic to be applied to the at least one analog line such that the current characteristic depends on the pixel values to be assigned to the pixels. The backplane device is adapted such that the pixel addresses are determined depending on the generated current characteristic as a pixel addressing scheme and such that the generated current characteristic is applied to the at least one analog line for the purpose of assigning the pixels value to the pixels.

In other words, the above mentioned problem is furthermore solved with a backplane device for a light source array or for a light source matrix. A light source might be a LED or an OLED. A circuitry is assigned to a light source for controlling the light source. One light source and one circuitry constitute a pixel. The pixels of a cluster are classified according to a pixel characteristic. The order of switching the light sources on or off depends on the pixel characteristic and not necessarily on the location of the pixel on the backplane device. The current to drive the light sources is controlled by at least one driver. The at least one driver is electrically connected to at least one pixel but does not belong to the circuitry of the pixel.

Preferably, the backplane device comprises at least two clusters, a cluster comprising a plurality of pixels forming a contiguous region of the backplane device.

BRIEF DESCRIPTION OF THE DRAWINGS

There are various possibilities for configuring and developing the teaching of the present invention in an advantageous manner. In this respect, reference should be made firstly to the patent claims, and secondly to the following explanation of the preferred exemplary embodiments of the invention with reference to the drawing. Generally preferred configurations and developments of the teaching are also explained in conjunction with the explanation of the preferred exemplary embodiments of the invention with reference to the drawing. In the drawing, in each case in a schematic illustration, FIGS. 4a and 4b show an example of a driving scheme for the 4×4 pixel cluster being shown in FIG. 3, FIG. 7a shows above an example of a light source matrix according to the prior art comprising 16 pixels to which four different grey values—pixel values—have been assigned and shows in the diagram below an example of the current to be applied on the analog line to assign the four different grey values to the 16 pixels of the light source matrix, FIG. 7b shows above an example of a light source matrix according to the present invention comprising 16 pixels to which four different grey values—pixel values—have been assigned and shows in the diagram below an example of the current characteristic to be applied on the analog line to assign the four different grey values to the 16 pixels of the light source matrix.

It is noted that the same or similar components shown in the Figures are referenced by the same reference numerals.

DETAILED DESCRIPTION OF THE INVENTION

In an embodiment of the present invention, a backplane device using a 3-TFT approach is used (1 dual gate selection TFT+1 transfer TFT). Compared to a 3-TFT LC backplane setup for a spatial light modulator as described in EP10156572.9 or in PCT/EP/2011/053912, an OLED is inserted instead of the pixel capacity. Accordingly, the basic principle of the backplane device disclosed in EP10156572.9 or in PCT/EP/2011/053912 can be applied to the backplane device for the light source array or light source matrix according to the present invention. Therefore, the entire content of the documents EP10156572.9 or PCT/EP/2011/053912 is incorporated herein by reference.

For the backplane according to the present invention the voltage source connected to the analog line is replaced by a current source. The TFTs are switching only digital, such there is no analog feedback into the pixel or into the circuitry of the pixel. The current flow is not regulated in the pixel circuit but thru outside drivers. This is especially applied for a cluster of the backplane device, wherein the backplane device comprises at least two, preferably many clusters.

Figure 1:
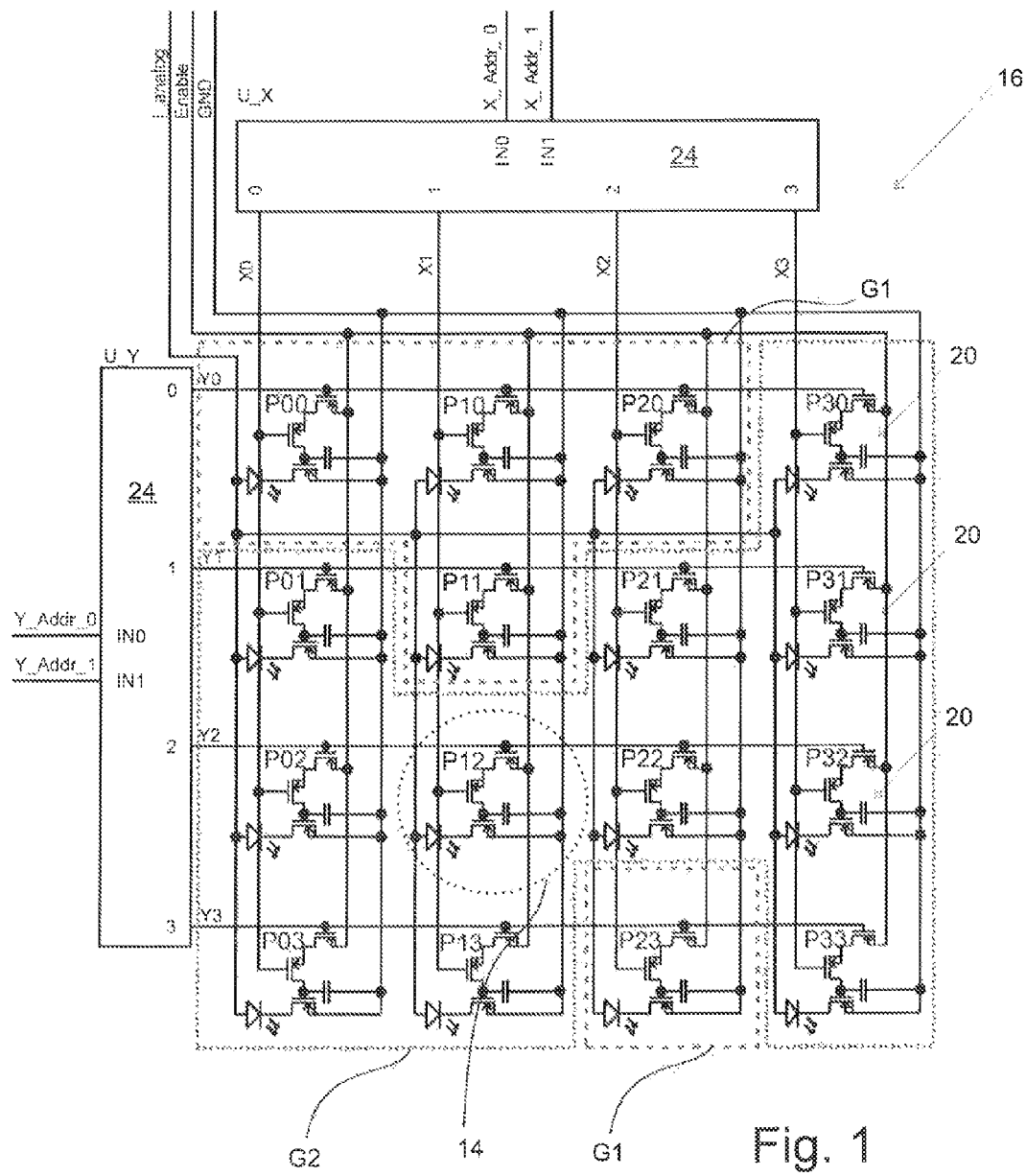
FIG. 1 shows an example of a part of a backplane device according to the present invention, FIGS. 2a and 2b each show an example of a pixel circuitry of a pixel, wherein such a pixel circuitry comprises 3 TFTs.
Figure 2A:
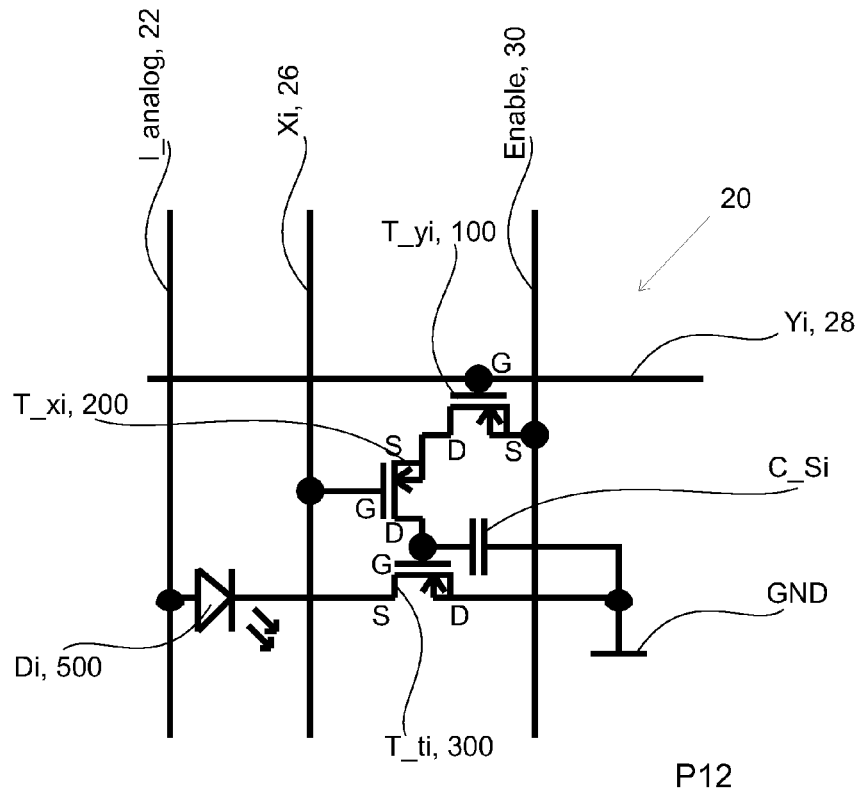
Figure 2B:
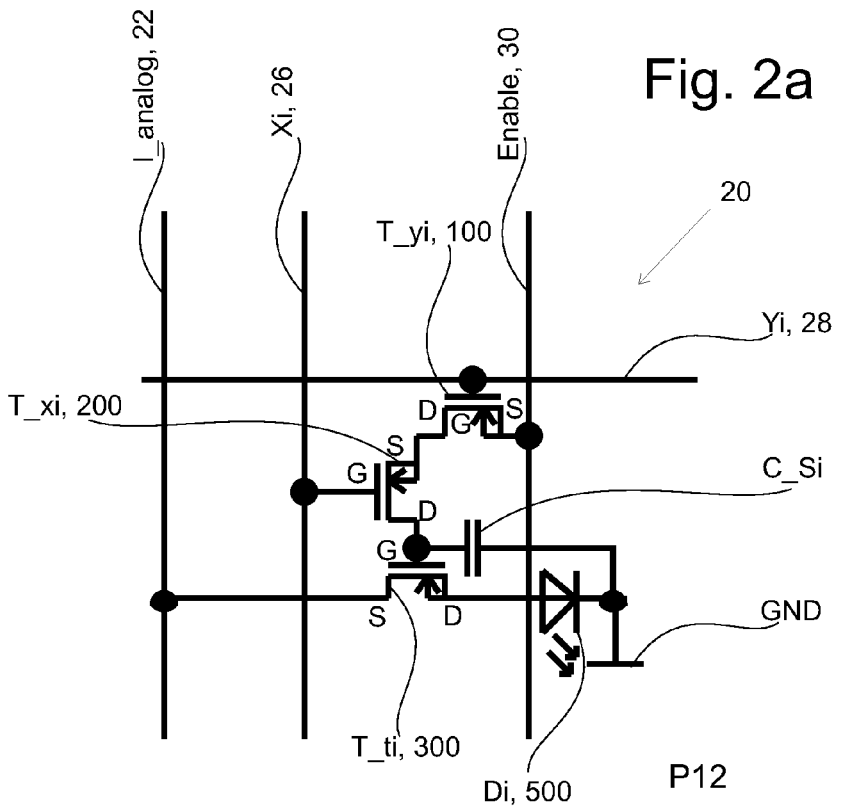

FIG. 1 shows a 4×4 pixel cluster of an embodiment of a backplane design. FIGS. 2a and 2b show in an enlarged representation two examples of the circuitry being used as a pixel circuitry 20 to drive one OLED, which might be used as one pixel of the 4×4 pixel cluster as shown in FIG. 1 in the dotted circle. The schematic representation of the address decoder 24 for the X0 to X3 lines is shown by the rectangle above the 4×4 pixel cluster in FIG. 1. The schematic representation of the address decoder 24 for the Y0 to Y3 lines is shown by the rectangle on the left hand side of the 4×4 pixel cluster in FIG. 1. Even though not shown in FIG. 1, it is also possible that the transistors of the X address decoder and/or the Y address decoder is integrated into the 4×4 pixel cluster. In other words, the transistors of the X address decoder and/or the Y address decoder can be placed in between the pixels, such that a seamless sequence or arrangement of the pixel clusters can be achieved without gaps, even if every single pixel cluster comprises its own X address decoder and/or the Y address decoder. The placement of the transistors of the X address decoder and/or the Y address decoder can be done in a manner such that the transistors of the X address decoder and/or the Y address decoder are not accumulated at one location, but rather are spread over the area of the cluster.

The backplane device 16 according to the present invention therefore might comprise pixel circuitries for providing the on/off control of single pixels 14. Furthermore, address decoder circuits might be provided for addressing single pixels 14. At least one address decoder circuit for a pixel cluster 18 might be assigned and/or located on the backplane device 16 at or near the location of the pixel cluster 18 either at the margin or the periphery of the pixel cluster 18, as shown schematically in FIG. 8. Alternatively, at least one address decoder circuit for a pixel cluster 18 might be integrated into and therefore might be located in the pixel cluster 18. The address decoder circuit for a pixel cluster 18 might be distributed within the pixel cluster 18.

OLED driving: A driving scheme is assumed that supports individual activation and deactivation of the pixels 14/OLEDs Di, 500. A 3-TFT solution described for OLED driving is shown in FIGS. 2a and 2b and FIGS. 9 and 10 and is adapted in a way to use the transfer-TFT (T_ti, 300) like a switch to close or open the connection between the analog line 22 and a ground line via the OLED Di, 500. The selection TFTs T_yi, 100 and T_xi, 200 in FIGS. 2a, 2b, 9 and 10 are used to address only one single pixel per cluster. The logic level of the "Enable"-line 30 as shown in FIG. 2a, 2b, 9, 10 selects the type of the operation, e.g. '1'=enable and '0'=disable.

After the address operation the current voltage value at the gate G of the transfer TFT T_ti, 300 is maintained by the additional gate storage capacity C_Si, see FIG. 2a, 2b. Nearly the same principle is used to store values in DRAM memory cells. The backplane device can be adapted such that a pixel being enabled by an enable address operation remains enabled the hole frame until it is disabled by a disable address operation.

At frame start all pixels 14 are disabled. First a number of pixels 14 are enabled. If a predetermined (e.g. a medium) number N of pixels are enabled, the analog line is used to apply a current $I_T=N*I_P$ were $I_P$ is the predetermined or desired current thru each OLED pixel of the N enabled pixels. The total current $I_T$ is regulated by an external programmable current source connected to the OLED display. If the number N of enabled pixels is changed, the current provided by the current source must be also adjusted to the new values. Because only one pixel is enabled or disabled per address cycle in one embodiment the approximate value of the total current is changing only slowly compared to the address operations, if the total number N is quite high.

For OLED displays with very low gray scale resolution and a broad uniformity of the brightness, it can be supposed that the threshold voltages of all OLEDs are approximately equal and the $R_{ON}$ of all transfer TFTs (T_ti, 300) are also approximately equal. Now the brightness of an OLED pixel can be adjusted by the duration an OLED pixel is enabled. So the brightest pixels are switched on early in the frame and are disabled at the end of the frame. In other words, the light source of the pixel is to be operated for a pre-determinable time period. Black pixels are not activated and dark pixels are only activated for a short time. Because of the non linear characteristic curve of an OLED, very small variations of the threshold voltage will result in large variations of the OLED current (I=f(U)). If OLEDs with different threshold voltages are connected in parallel, the currents are not equally divided up between all enabled pixels.

To compensate for this, the time an OLED pixel is enabled must be adjusted by a correction factor computed from the current-voltage response curve of this pixel and from the curves of all other enabled pixels. If a large number of pixels are enabled, it is possible to use an average voltage response curve instead of the superposition of all other enabled pixels. This will reduce computing effort, because only a correction value stored for each pixel must be multiplied with the desired pixel brightness to compute the on-time of a pixel. However, this shows that a classification of the pixels and in particular of the OLEDs of the pixels according to a pixel characteristic is helpful for determining the order of switching the single light sources on and/or off depending on the pixel characteristic.

If the threshold voltages are too different, nearly all current flows thru the OLEDs with the lowest threshold voltages. To prevent this, only OLED pixels with similar threshold voltages are enabled at one time. For instance, pixels with high threshold voltages at frame start and pixels with low at the end. In this case, the average voltage response curve used to compute the correction values must be adapted equally to the average values of the enabled pixels. A calibration for all pixels might be performed, in order to determine the pixels with similar threshold voltages. This can be done by applying the measurement schemes mentioned above. These characteristics might be stored.

In an embodiment of the present invention, a switch on is only performed for pixels with the similar threshold voltage. Therefore, the pixels are sorted by the OLED threshold voltage VT as a pixel characteristic. A number N of pixels with similar VT are connected to the analog line 22. A programmable current source (I_analog) is connected to the analog line 22. The total current (I_analog) is divided by the number of the parallel connected OLED pixels. The current thru one OLED Di is about I_Pixel=I_analog/N.

The measurement of pixel characteristics can be performed as follows: If only one OLED Pixel per Cluster is selected (T_t conductive) the electrical characteristics of each single OLED can be measured one by one thru the analog line 22. This can be done once after power-up or in the background. If for instance 1% of the frame time is used to measure 1% of the pixels, the measurement-cycle of 100 frames is short enough to compensate for aging effects.

Aging effects of OLEDs and a-Si TFTs are normally in time periods greater than 120 s. It is possible to measure the threshold voltage but also the voltage to current response curve according to the measurement schemes mentioned above.

In a preferred embodiment, there is provided an external current regulation and a maximum current driving. An OLED pixel (i.e. the OLED light source of a pixel) is connected to the analog line 22 being adapted to act as a current source and is enabled by the enable operation (enable line 30 on, X and Y address line 26, 28 on). If a new pixel is connected to the analog line 22, the total current I_analog has to be increased by the external programmable current source in order to maintain the maximum current flowing thru each enabled pixel and therefore through each OLED light source of the enabled pixels. Depending on the pixel brightness, after a time period the pixel is disconnected from the analog line by a disable operation (X and Y address line 26, 28 on, enable line 30 off). The start of the time period of a pixel being enabled is defined by its threshold voltage. The duration of the time period is defined mainly by the brightness of the pixel. Because a large number of pixels are enabled at the same time the threshold voltages of these pixels are similar but not equal. This might result in small variations from the ideal current I_Pixel=I_analog/N. A compensation with small offset values for start and duration (position and length) of the time period is computed depending on the division of the currents between the enabled pixels. Because a pixel with maximum brightness is enabled only for a portion of the frame time, the OLEDs are pulsed with adapted higher maximum pixel current.

Additionally or alternatively, driving the OLEDs with different currents is provided. An OLED display offers a very large on/off contrast ratio. Depending on the desired brightness-resolution the time period of a very dark pixel is too short to address, if the pixel is driven with the maximum current for this pixel. To solve this problem, all dark pixels with similar threshold voltage VT are enabled only on special dark periods, where the driving current is reduced to a small portion of the maximum current (for instance 10%). The bright pixels with similar threshold voltage VT can be enabled at the dark period too, to shorten their duty cycle. But if these pixels are disabled, the current division is improved because of the lower number of pixels enabled at the same time. Therefore, depending on the pixel characteristics, at least two groups G1, G2 of pixels can be determined. The pixels of each pixel group G1 or G2 can be controlled collectively. Two groups G1, G2 of pixels are indicated by the different dotted lines of the two groups of pixels G1 and G2 as shown in FIG. 1. This might be applied on the complete light source matrix or in a cluster.

In an implementation for an OLED backplane structure or a backplane device 16 clusters 18 of pixels are used and the OLED backplane structure comprises preferably only digital switching TFTs (Thin Film Transistors). A cluster of pixels in the sense of the present application is especially a plurality of pixels forming a connected or a contiguous region of the light source matrix or of the display. Such a region might have a rectangular shape, a square shape, a honeycomb shape or any other suitable shape. Preferably, a cluster does not extend over a full width or a full length of the display. Several clusters can be arranged next to each other in a seamless manner. A cluster can be regarded as a sub-display.

Figure 3:
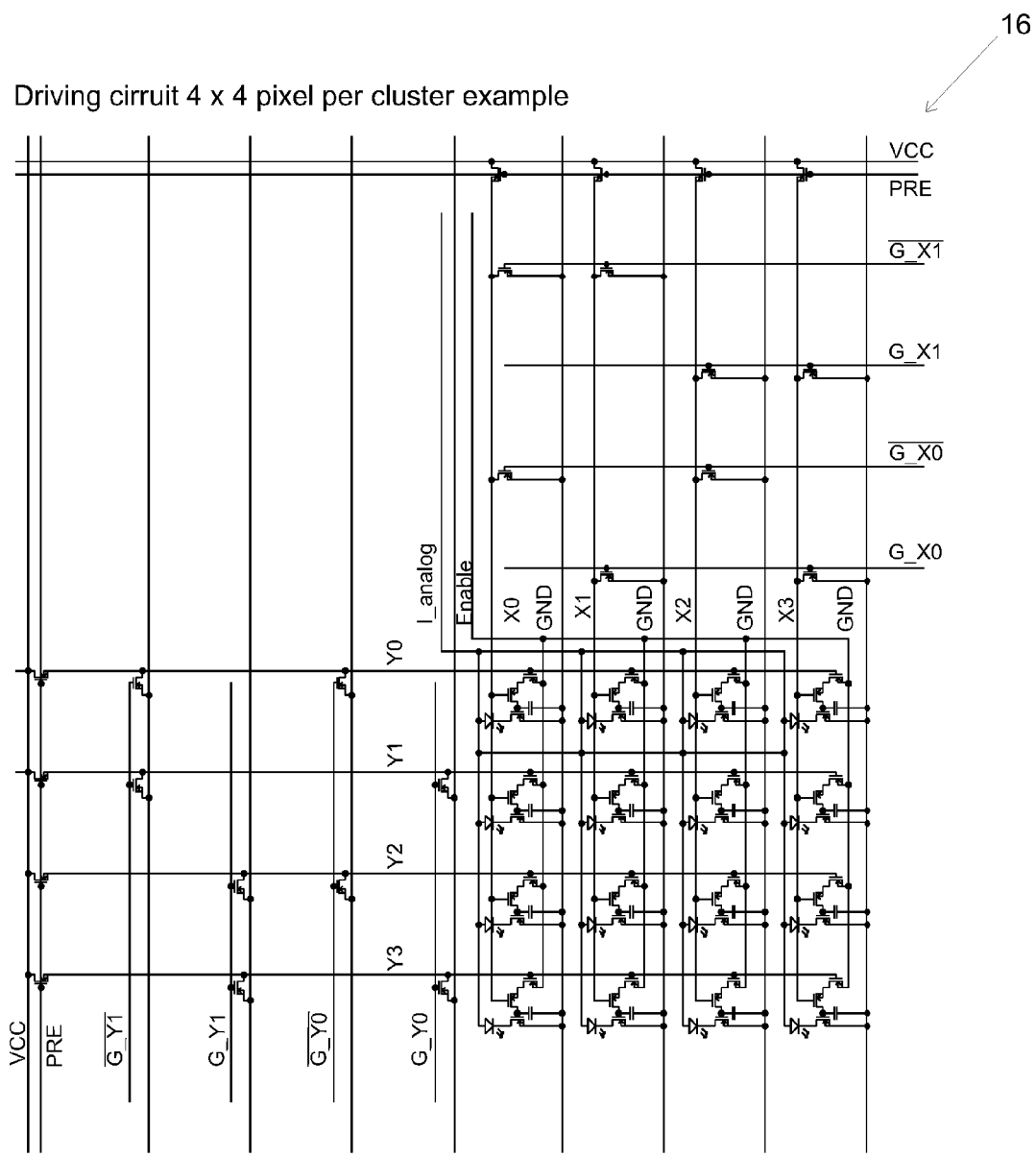
FIG. 3 shows the part of the backplane device according to FIG. 1 wherein the address decoders are shown in more detail.

If negated and non negated address lines are used, address decoders can be integrated using only NMOS a-Si TFTs. This requires a doubled amount of global address lines compared to a CMOS implementation. A display with 60 fps (frames per second) and 64×64 pixels per clusters need an a-Si TFT switching frequency of about 350 kHz. A total of 0.22 TFTs/pixel are needed to implement the address decoders. So this embodiment enables a driving of the OLEDs using a-Si address decoders. FIG. 3 shows an example cluster design comprising 4×4 pixels. FIG. 3 shows furthermore the pixel circuit and the address decoder circuits not being embedded into the pixel matrix. The address decoder circuits as shown above and to the left hand side of the 4×4 pixel circuitry in FIG. 3 correspond to the x and y address decoders 24 indicated by the rectangles as shown in FIG. 1.

The static and dynamic pixel characteristics can be predicted with suitable models in order to compute the values for the external current source and the address operations.

Because the backplane circuit is only driven by digital values to compensate for the large TFT variations, the analog pixel characteristics have to be measured/determined by external circuits. It might be necessary that a frame memory and a computing unit are needed to determine the driving parameters for each pixel.

The characteristics of the backplane device according to a preferred embodiment can be outlined by the following features: a light source matrix with OLED light sources used as a display with only 3.25 TFTs/pixel are provided. a-Si, p-Si and amorphous oxide TFTs are possible. Digital switching TFTs marginalize the LTPS threshold voltages variations. Power savings can be achieved because the OLEDs are directly driven through the very low $R_{ON}$ of the Transfer-TFT. Only one DAC (Digital to Analog Converter) per cluster is needed, not one per column line. The present invention supports very high on/off current ratios.

New pixel circuits are achieved by multiplexing of an analog-line and one address-line, a combination of the enable-line and one address-line or both. More than 10 variations are possible, depending on the specific characteristic of the behaviour of the OLEDs. Four examples are illustrated in FIGS. 2*a*, 2*b*, 9 and 10.

As address decoders normal existing variants like "NAND address decoder" or "NOR address decoder" can be applied. The address decoders can be embedded into the pixel matrix or can be arranged not being embedded into the pixel matrix.

Figure 4B:
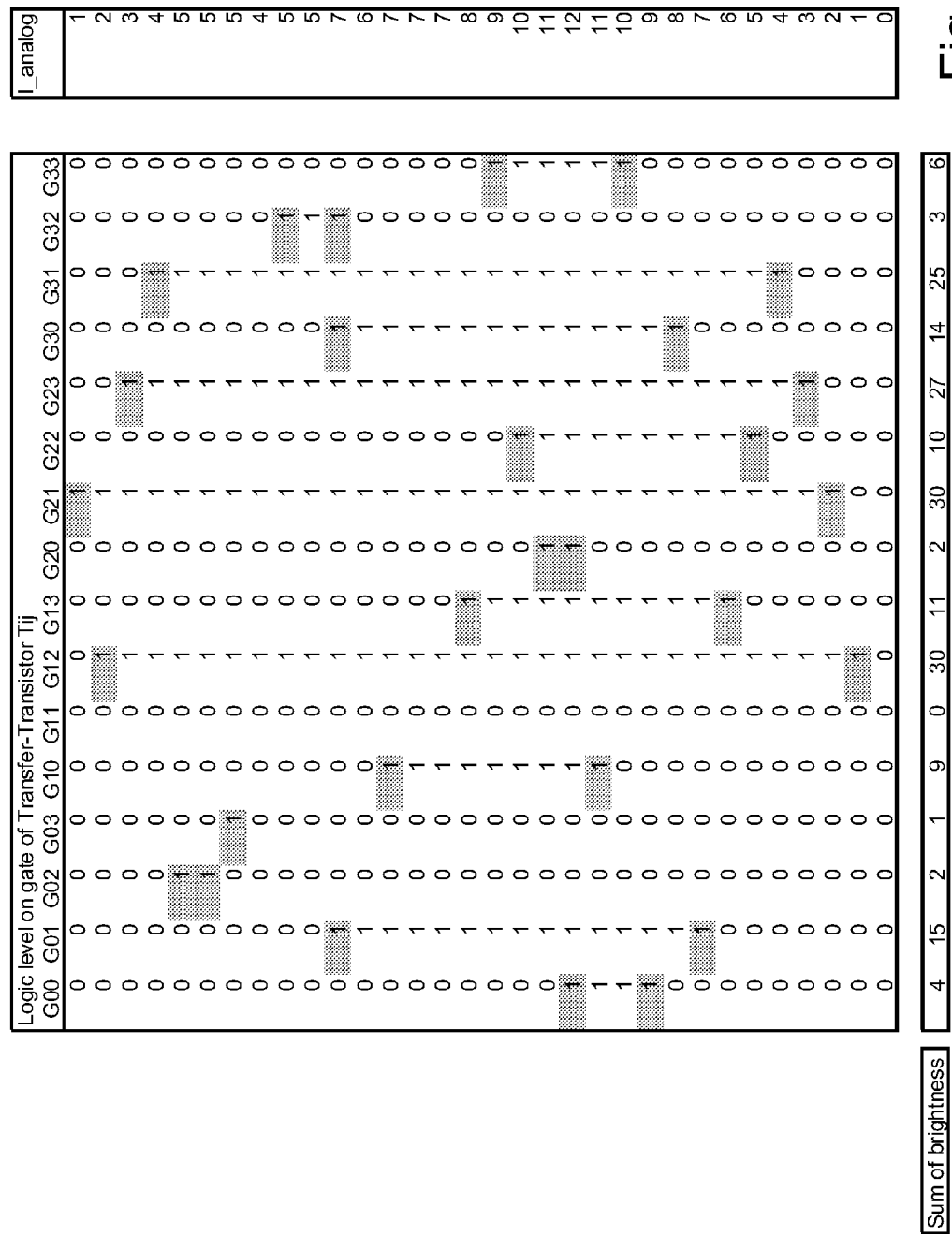

A global data distribution can be achieved by applying shift registers and/or global lines with amplification and/or global lines with a threshold circuit. Examples for that are described e.g. in WO 2009/024523 A1 or WO 2009/092717 A1. FIG. 4 shows an example of a driving scheme for an example 4×4 pixel cluster which is shown in FIG. 1 or 3. The tables being shown in FIG. 4*b* are to be completed on the right hand side of the tables shown in FIG. 4*a*. In FIG. 4*a* the X and Y addressing and the Enable E operation is shown. In the left table of FIG. 4*a*, the y-addressing operations of two the global y-addressing lines G_Y0 and G_Y1 as well as the four y-addressing lines Y0, Y1, Y2 and Y3 are shown. In the middle table of FIG. 4*a*, the x-addressing operations of two the global x-addressing lines G_X0 and G_X1 as well as of the four x-addressing lines X0, X1, X2 and X3 are shown. In the very left table entry of FIG. 4*a*, the enable or disable operation on the Enable line of the pixel cluster is indicated. This is also shown in the very right table of FIG. 4*a*. The order of addressing and enabling is done from the top row to the bottom row in a sequential order. In the upper left table of FIG. 4*b*, the logic levels on the gates G00 to G33 of the transfer transistors of the pixels P00 to P33 are shown as a consequence of the addressing and enabling operations as shown in FIG. 4*a*. The reference G00 relates to the gate of the transfer transistor of the pixel P00, the reference G01 relates to the gate of the transfer transistor of the pixel P01 and so on. A transfer transistor can either be in a conductive state—then the logic level is 1—or in a non-conductive state—then the logic level is 0—. It is indicated with a grey background when the logic level on one of the gates G00 to G33 changes from 0 to 1 or from 1 to 0. For example, pixel P11 is not enabled at all during the frame cycle as shown in the tables of FIGS. 4a and 4b; pixel P21 is enabled first, pixel P12 is enabled thereafter. Pixels P21 and P12 are enabled for the same amount of time and therefore appear with the same brightness and, because they are enabled for the longest duration, they appear as the brightest pixels with a value of 30, as indicated in the lowest row of FIG. 4b being labelled with "Sum of brightness". In the table on the right side, the current values being applied on the analog line I_analog are indicated. In this example, every light source is operated with the same current value, e.g. with 1 arbitrary unit (1 a.u.). If e.g. two pixels are enabled, two times of the current value (=2 a.u.) is supplied on the analog line. Therefore, when 12 pixels are enabled, the twelvefold of the current value (=12 a.u.) is supplied on the analog line.

Figure 5:
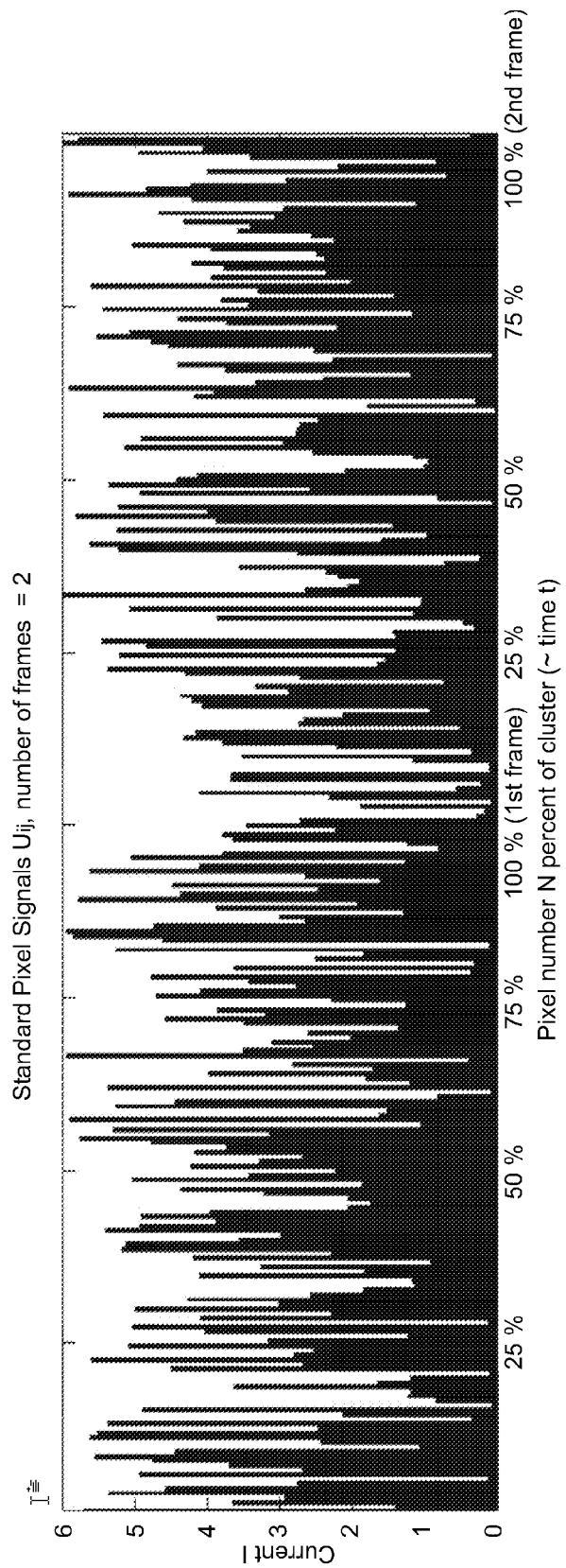
FIG. 5 shows in a schematic diagram an example of the current characteristic of an analog line of a backplane device according to the prior art, using uniformly distributed pixel values appearing in a holographic display application.

FIG. 5 shows in a schematic diagram an example of the current characteristic of an analog line of a backplane device according to the prior art.

The current I is shown in arbitrary units (a.u.) as the function of the pixel number N for the duration of two frames. Because of the addressing scheme of the prior art, wherein the pixels of a spatial light modulator and for a light source array or matrix are addressed line by line and within a single line are addressed one after another, different uniformly distributed currents between the range of 0 a.u. and 6 a.u. are applied on the analog line of the prior art backplane, whenever the next pixel according to the fixed addressing scheme is addressed. This results in driving analog values from the outside of the display area in a very fast manner, leading to the physical limits of the electronics of a backplane device, for example the large line capacities prevent increasing switching frequencies on the continues analog lines. This approach also makes a high precision of the TFTs being applied necessary, in order to ensure analog signal quality. However, the frame rate or refresh rate of the spatial light modulator or the light source array or matrix can be increased according to the particulars of the present invention.

Figure 6A:
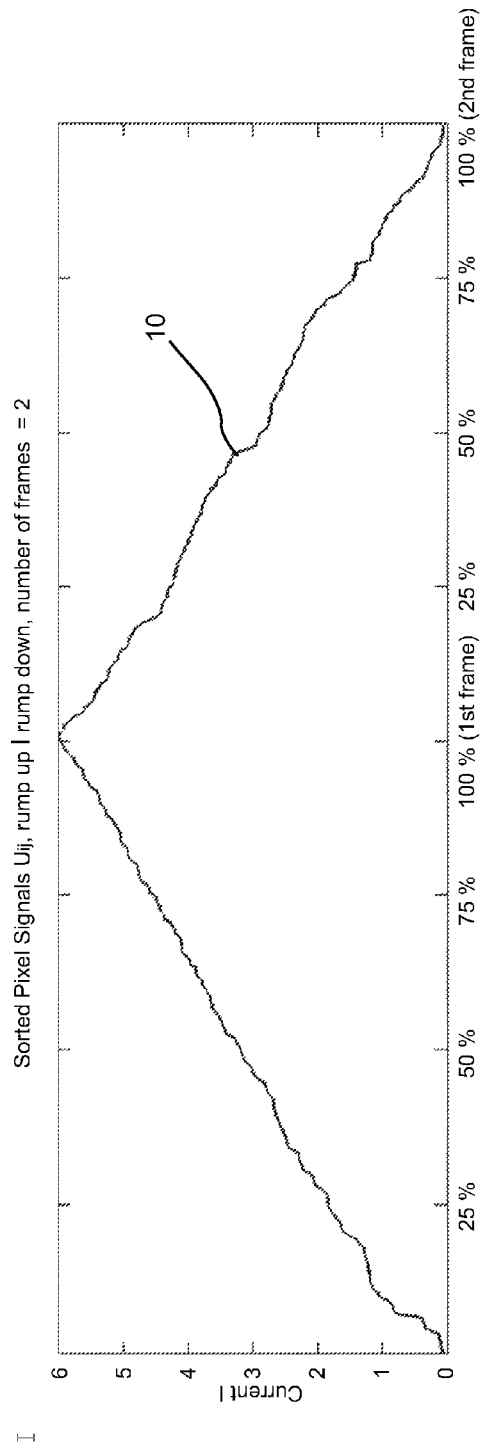
FIG. 6a shows in a schematic diagram an example of the current characteristic of an analog line of a backplane device according to the present invention.
Figure 6B:
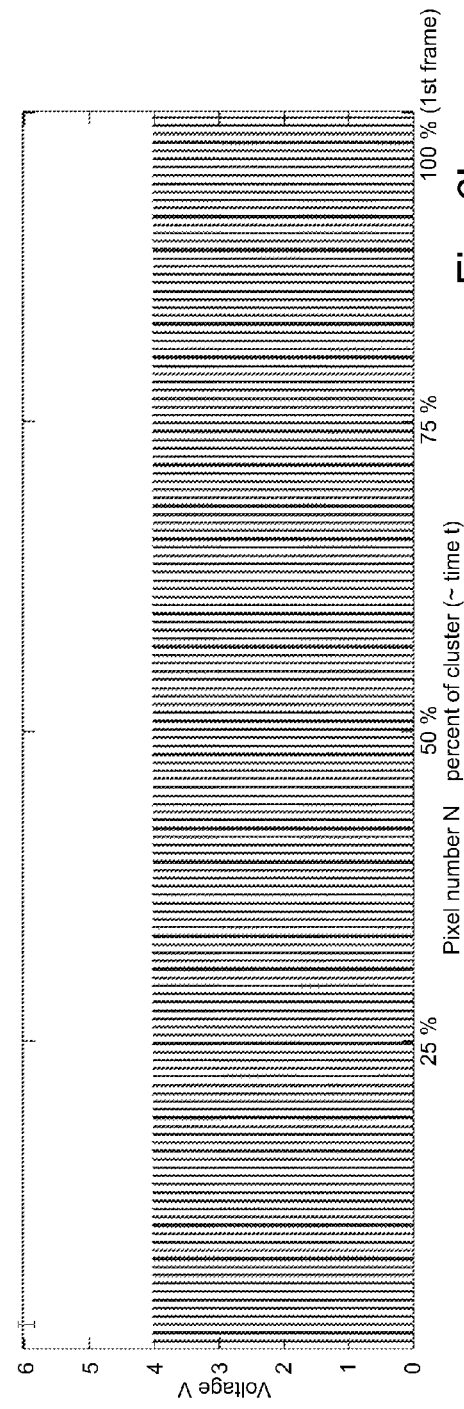
FIG. 6b shows, in a schematic diagram, an example of the pixel addressing signals according to the present invention.

According to the present invention, a pixel value assigning scheme being different to the one known from the prior art is used. This can be seen by the schematic diagram shown in FIG. 6a. The diagram in FIG. 6a shows a current characteristic 10 being a current function which is applied to the analog line of the backplane device, to which the pixels are connected. This current characteristic 10 shown in the diagram comprises the current values which are applied to the analog line during two frames. The current characteristic 10 comprises the shape of essentially a ramp up function for the first frame and comprises essentially a ramp down function for the second frame. A high precision of the pixel value or the current to flow through the light source of the pixel can be achieved, because the alteration of the current characteristic 10 comprises a relative low frequency. According to this embodiment of the invention, the current characteristic 10 has been generated depending on the pixel values which have to be assigned to single pixels of the light source matrix by the backplane device. Because the current characteristic 10 is almost a function comprising a linear increase for the first frame and almost a linear decrease for the second frame, the pixel values to be assigned to the pixels are rather highly distributed. In other words, no regions comprising the same pixel value appear in the two frames which will be assigned by the current characteristic 10 of FIG. 6a, because if, for example ⅓ of all pixels would have the same pixel value, this would result in a region of the current characteristic 10 being horizontal or parallel to the abscissa as shown in the diagram of FIG. 6a. The schematic diagram according to FIG. 6b shows the pixel address signals which are applied to the addressing lines of the backplane device for the first frame. As can be seen, in this embodiment, high frequency signals are applied to the addressing lines. However, because these addressing signals are digital signals having the logical value of either 0 or 1, this can be realized electronically at a higher frequency than realizing the high frequency analog values as they are shown for example in FIG. 5.

FIG. 7a shows a schematic representation of a part of a light source matrix 12 comprising pixels 14 and comprising a backplane device (not shown) according to the prior art. The pixels 14 of the light source matrix 12 as shown in FIG. 7a comprise four different pixel values 15 being indicated with different hatching. In the example of FIG. 7a four pixels have been assigned with the maximum pixel value 15 of 100%. Three pixels 14 comprise the pixel value 15 of 66%. Six pixels 14 comprise the pixel value 15 of 33% and the remaining three pixels comprise the pixel value 15 of 0%. Indicated by the numbers in each pixel 14 of the light source matrix 12 of FIG. 7a the address numbering of the single pixels 14 is indicated starting at 1 and ending at 16. Below the light source matrix 12 from FIG. 7a is indicated in the diagram the current characteristic 10 being a current function which is applied to the analog line of the backplane device, to which the pixels 14 are connected. On the abscissa, the fixed clock cycles of the pixels 14 being addressed are shown. The pixels 14 are addressed in a fixed order as shown on the abscissa, i.e. starting with pixel 1 and ending with pixel 16. As a result, high frequency "arbitrary" values have to be applied on the analogue line, comparable to the ones shown in FIG. 5. The current characteristic 10 (being 0% to 100%) is shown in dependence from the pixel address (being 1 to 16). As can be seen, depending from the pixel values to be displayed with the light source matrix 12, the current characteristic 10 is very fluctuating or comprises alternating current values, thus limiting the maximum speed with which the light source matrix 12 can be addressed or encoded.

FIG. 7b shows a schematic representation of a part of a light source matrix 12 comprising pixels 14 comprising a backplane device (not shown) according to the present invention. The pixels 14 of the light source matrix 12 as shown in FIG. 7b display the same pixel values 15 as the light source matrix 12 as shown in FIG. 7a. Because the addressing of the pixels 14 of the light source matrix 12 as shown in FIG. 7b is carried out in a different manner compared to the prior art, the address numbering of the pixels 14 (being indicated by the numbers written in each pixel 14) of the light source matrix 12 depends on the pixel value 15 to be assigned to each pixel 14.

FIG. 7b below shows in a schematic representation the current characteristic 10 to be applied on the analog line (not shown in FIG. 7a, 7b) for the pixel value 15 distribution as indicated in FIG. 7b above. On the abscissa of FIG. 7b the addressed pixels 1 to 16 are shown and the numbers are indicated in the pixels 14 of the light source matrix 12. However, the order in which those 16 pixels are addressed is an order being indicated in the row below the addressed pixels. It appears that the order of addressing the pixels 14 is arbitrary. However, the order of addressing the pixels 14 depends on the pixel value 15 to be displayed with the light source matrix 12. Accordingly, the analog values being assigned to the different pixels 14 might have a characteristic of a ramp-up function having a low frequency of changing currents. As it can be seen, the current corresponding to the pixel value 15 of 0% is applied to the analog line for a total of 3 pixel addressing cycles, i.e. the pixels 1, 2 and 3 having the addresses 1, 4 and 11 (which correspond to the address numbering indicated in the pixels 14 of FIG. 7*a*). The current corresponding to the pixel value 15 of 33% is applied to the analog line for six pixel writing cycles, i.e. for the pixels 4-9. The current corresponding to a pixel value 15 of 66% is applied for three addressing cycles, i.e. for the pixels 10-12. The current corresponding to the pixel value 15 of 100% is assigned for four pixel addressing cycles to complete the assigning of all 16 pixels 14 of the light source matrix 12 for one frame as shown in FIG. 7*b*. Each pixel 14 is enabled for the duration of a pixel cycle only, wherein the duration of the pixel cycles is essentially identical.

As can be seen from FIGS. 6*a* and 7*b*, the current characteristic 10 is variable in time and in these examples has predominantly the characteristic a mathematically monotonic function.

Starting with the pixel value distribution of the pixels 14 of the light source matrix 12 as shown in FIG. 7*a* or 7*b*, the current characteristic 10 as shown in FIG. 7*b* below is generated. In this example, a ramp up function is applied. Therefore, the current characteristic 10 starts with the lowest current and increases to the highest current. Therefore, the current characteristic 10 depends on the pixel values 15 to be assigned to the pixels 14. This is to be understood in particular under the term "pixel value assigning scheme". The current characteristic 10 is generated by a generating means not shown in FIG. 7*b*.

Once the current characteristic 10 has been generated depending on the pixel values 15 to be assigned to the pixels 14, the pixel addresses of the pixels 14 to be addressed when the current characteristic 10 is applied to the analog line are determined. As can be seen, the pixels 14 comprising a pixel value 15 having 0% will be addressed first. It is not necessary that the addresses of the pixels 14 having the 0% pixel value 15 are exactly in the order as indicated above. A different order of assigning these pixel values 15 to the pixels 14 could be used as well. Therefore, it is possible that the generated current characteristic 10 being applied to the at least one analog line determines the order of addressing of the pixels 14. In this example, the addressing of all pixels 14 to which the same pixel value 15 is assigned is performed in temporal proximity to each other.

Advantageously, the analogue current can be ramped-up slowly from a minimum value to a maximum value with very few external drivers. The addresses or positions of the pixels to which a certain analog value is to be assigned is digitally transferred to the address decoders. If the backplane device comprises plurality of single clusters, then the addresses of all pixels of a cluster are digitally transferred to the address decoders of the cluster.

Figure 8:
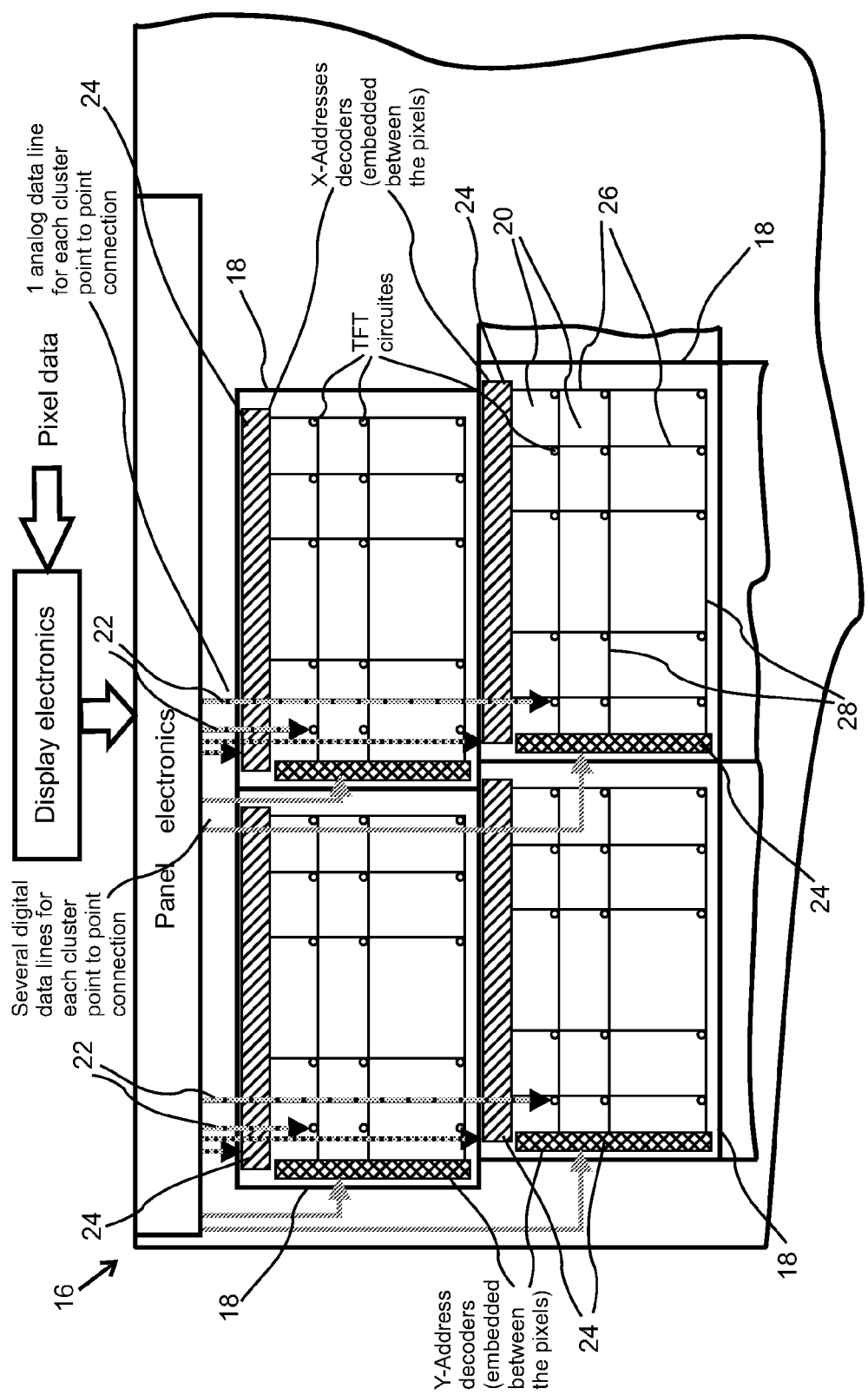
FIG. 8 shows an example of a backplane device according to the present invention comprising a plurality of clusters, of which only four clusters are shown.

FIG. 8 shows an example of a backplane device 16 comprising a plurality of clusters 18. FIG. 8 does not show the complete backplane device 16, but only a single section of it. Therefore, only four clusters 18 are shown in FIG. 8. Every cluster 18 comprises pixel circuits 20 being indicated schematically with single squares. Every pixel circuit 20 is assigned to a pixel of the light source matrix (not shown in FIG. 8). According to the embodiment as shown in FIG. 8, the clusters 18 are controlled independently from each other. The pixels and therefore the pixel circuits 20 form a connected and contiguous region of the backplane device 16 as well as of the light source matrix to form the cluster 18. The connected regions of this embodiment have a rectangular shape and the clusters 18 do not extent over the full with or over the full length of the backplane device 16 or the light source matrix.

Every cluster 18 comprises an analog line 22 as well as pixel addressing means 24 for addressing the pixels or the pixel circuits 20 of the cluster 18. It is schematically indicated in FIG. 8, that pixel data coming for example for a computer are transferred to the display electronics of the display device in which the light source matrix and the backplane device 16 is included. The display electronics transfers the pixel values and the addressing values to the panel electronics of the backplane device 16. Depending on the particular configuration of the display device, the current characteristic 10 and the pixel address can be generated either in the computer or in the display electronics of the display device or in the panel electronics of the backplane device 16. In FIG. 8 it is indicated, that each cluster 18 comprises a connecting line between the panel electronics and the pixel addressing means 24 for transferring address information to the pixel addressing means 24. It is schematically shown in FIG. 8 that the pixel addressing means 24 is connected and/or comprises x-addressing lines 26. The addressing means 24 for addressing the y-address of a pixel comprises y-addressing lines 28.

For achieving redundancy, a build-in "software" approach and/or additional redundancy circuits can be applied.

The concept of the present invention can especially be applied in an advantageous way for display designs comprising backplanes using clusters, for example as disclosed in WO 2009/024523 A1, WO 2009/092717 A1, WO 2008/138983, WO 2008/138984, WO 2008/138985, WO 2008/138986 or EP10156572.9 or PCT/EP2011/053912, all of which are copied with their whole content herein by reference. Furthermore, the concept of the present invention can be applied for displays displaying 2D and 3D content. 3D displays might especially be stereoscopic displays, stereoscopic displays generating multi-views, auto-stereoscopic displays with tracking of the user's eyes and holographic displays. Such a 2D or 3D display could be operated in transmissive, in reflective or in transflective mode. Such a 2D or 3D display could be working on the principle of OLED, LCD (Liquid Crystal Display) or PDP (Plasma Display Panel).

With the backplane device according to the present invention it is possible to scale up to larger sizes and resolutions for a light source array/light source matrix, especially because of the cluster approach. The display size is nearly unlimited, because the digital lines can be extended with registers and the analog line has very low frequency. It is furthermore possible to achieve power savings while operating the light source array/light source matrix with the backplane device according to the present invention, due to driving the light sources—OLEDs—directly over the low $R_{on}$ of the transfer TFTs of the pixel circuits. A very high grey scale resolution and contrast can be obtained, because the OLED current and/or the OLED on-time can be controlled very precisely. With the backplane device according to the present invention it is possible to control the pixel value of each pixel (e.g. the brightness at which each light source of the light source array or light source matrix is operated) either by the duty cycle (or duration per time interval) each pixel is activated or by the current value being applied to each pixel (or each light source) or by the combination of both alternatives. The digital switching of the TFTs of the pixel circuitry tolerate the threshold voltage changes caused by gate bias stress. Especially if the light source array/light source matrix comprises OLEDs as single light sources, the lifetime of the OLEDs can be expanded advantageously, because a single OLED is loaded with a rather constant current distribution during its duty cycle when being switched on when being driven by a backplane device according to the present invention compared to the rather peaked current distribution while being switched on when being driven by a backplane device according to the prior art.

The low duty cycle of the pixel TFTs allows to maintain digital function over the life time without compensation. Higher duty cycle of pixel TFTs are advantageous in respect to lengthen the life-time for each of them, but individual compensation might be necessary. Because a smaller number of TFTs for each pixel circuitry is needed, a higher yield in production of the backplane device can be achieved.

The well known problem of TFT gate bias stress is caused by impurity traps and other reasons of the TFTs of an a-Si backplane leading to charge trapping in TFT as a reason for threshold-voltage shift. Impurity traps are statistically distributed. The gate bias stress also statistically differs between TFTs.

According to the addressing scheme of the present invention, it is possible to individually address each pixel e.g. by a direct electrical connection from outside to each pixel allowing direct measurement of the characteristics of the pixel, e.g. the pixel circuitry and/or the light source. By these means, measurement can be easily controlled from outside the panel. Such a measurement process can be performed in real-time as a background measurement process, e.g. within 1% of the frame time. There is no need to implement additional TFTs in matrix/on the pixels to carry out such measurements.

The selection TFTs (T_yi, 100; T_xi, 200) according to the present invention comprise a low duty cycle. This allows to maintain the digital function of the selection TFTs over the lifetime of the backplane device without substantive further compensation. It is also possible to reverse potential effects with a negative gate voltage pulse. TFTs with medium duty cycles (such as address decoder TFTs) can be sufficiently compensated with a collective pulse. This collective compensation is also possible for the pixel TFTs ("transfer TFT", 300) for low duty cycle OLED pixels. The concept of the backplane device according to the present invention also allows to individually compensate each pixel TFT for OLED duty cycles up to 100%. As a result, brightness and colour of the pixel values will not change until the end of the lifetime.

For example, the average duty cycles of the address decoder TFTs are within the range between 10% and 20%. A compensation for the address decoder TFTs can be done collectively. The average duty cycles of the selection TFTs (T_xi, T_yi according to FIG. 2) are within the range between 0.2% and 1%. The selection TFTs (T_xi, T_yi) do not need a compensation. The average duty cycles of the pixel driving TFTs (transfer TFTs, according to FIG. 2) are up to 80%. A compensation for the pixel driving TFTs (transfer TFTs, Tip can be done individually or collectively depending on length of duty cycle. Measurements of single TFTs of all three types of TFTs can be carried out on an individual basis.

Figure 9:
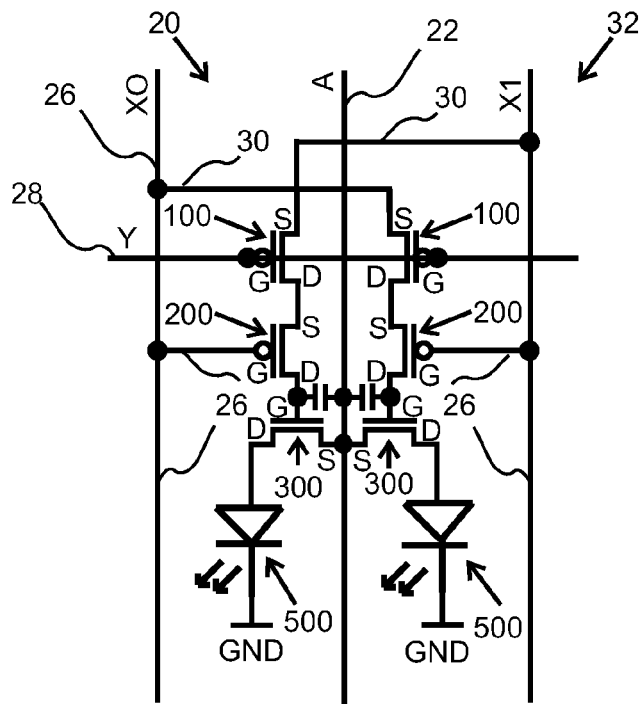
FIG. 9 shows an example of two neighbouring pixels of the backplane device for the light source matrix, wherein each pixel comprises a pixel circuitry comprising 3 TFTs

FIG. 9 shows an example of two pixel circuitries 20, 32 for two neighbouring pixels, each pixel circuitry 20 or 32 comprising three TFTs 100, 200, 300 according to the second embodiment mentioned above. The two pixels are addressed by the same y-addressing line 28. The first TFT 100 of the first pixel circuitry 20 is connected to the x-addressing line 26 (X1) of the second pixel circuitry 32—as an enabling function and therefore indicated with reference numeral 30—, to the y-addressing line 28 and to the second TFT 200 of the first pixel circuitry 20. The second TFT 200 of the first pixel circuitry 20 is connected to the first TFT 100 of the first pixel circuitry 20, to an x-addressing line 26 (X0) of the first pixel circuitry 20 and to the third TFT 300 of the first pixel circuitry 20. The third TFT 300 of the first pixel circuitry 20 is connected to the second TFT 200 of the first pixel circuitry 20. The third TFT 300 of the first pixel circuitry 20 is adapted to switch an electrical connection between the analog line 22 through the light source 500 of the first pixel circuitry 20 to the ground GND. The first TFT 100 of the second pixel circuitry 32 is connected to the x-addressing line 26 (X0) of the first pixel circuitry 20—as an enabling function and therefore indicated with reference numeral 30—, to the y-addressing line 28 and to the second TFT 200 of the second pixel circuitry 32. The second TFT 200 of the second pixel circuitry 32 is connected to the first TFT 100 of the second pixel circuitry 32, to an x-addressing line 26 (X1) of the second pixel circuitry 32 and to the third TFT 300 of the second pixel circuitry 32. The third TFT 300 of the second pixel circuitry 32 is connected to the second TFT 200 of the second pixel circuitry 32. The third TFT 300 of the second pixel circuitry 20 is adapted to switch an electrical connection between the analog line 22 through the light source 500 of the second pixel circuitry 32 to the ground GND. This embodiment does not have to have a separate enable line on the backplane device for the enablement functionality of a pixel. This is achieved by using the x-addressing line 26 of the one pixel as the enable line 30 for the other pixel of the two neighbouring pixels 20, 32. This can be done, if the logic level of the enable line 30 corresponds to the logic level of the x-addressing lines 26. Depending on whether a n-channel or p-channel transfer TFT 300 or n-channel or p-channel selection TFTs 100, 200 are used, the following control schemes need to be applied (X0, X1=signal being applied to the respective x-addressing line 26, Y=signal being applied to the y-addressing line 28):

| Y | X1 | X0 | |
|---|----|----|---|
| n-channel-transfer TFT & n-channel-selection TFT | | | |
| 1 | 1 | 1 | enable both |
| 1 | 0 | 1 | disable left |
| 1 | 1 | 0 | disable right |
| p-channel-transfer TFT & n-channel-selection TFT | | | |
| 1 | 1 | 1 | disable both |
| 1 | 0 | 1 | enable left |
| 1 | 1 | 0 | enable right |
| p-channel-transfer TFT & p-channel-selection TFT | | | |
| 0 | 0 | 0 | enable both |
| 0 | 1 | 0 | disable left |
| 0 | 0 | 1 | disable right |
| n-channel-transfer TFT & p-channel-selection TFT | | | |
| 0 | 0 | 0 | disable both |
| 0 | 1 | 0 | enable left |
| 0 | 0 | 1 | enable right |

Figure 10:
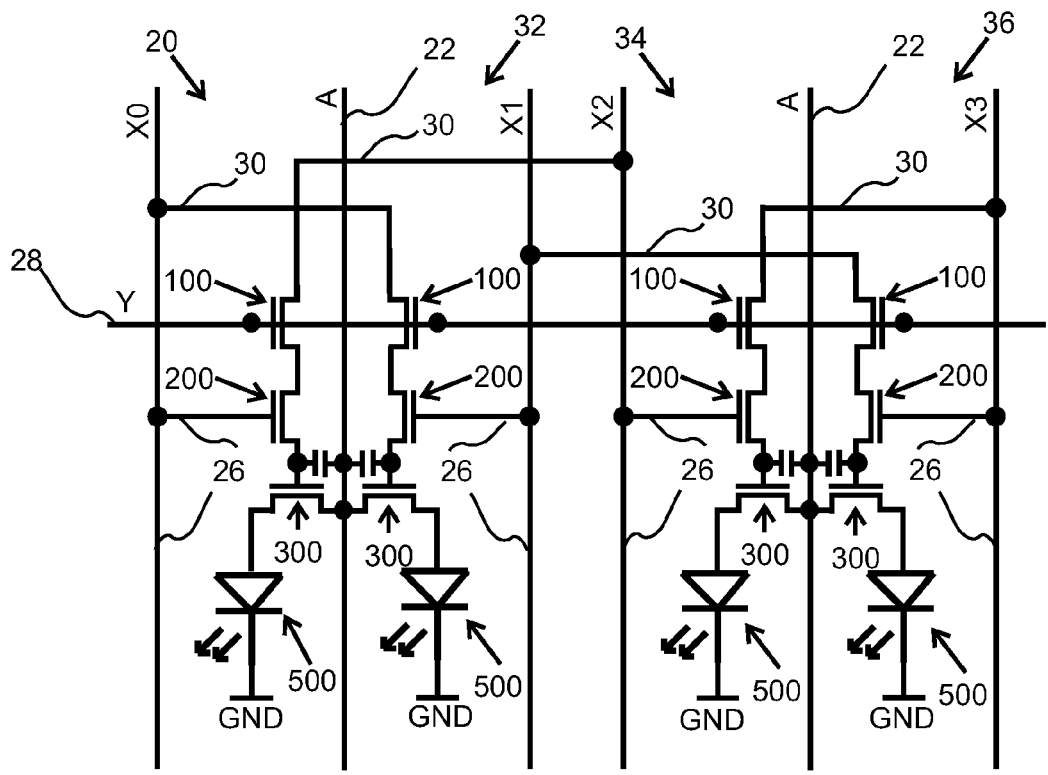
FIG. 10 shows an example of four neighbouring pixels of the backplane device for the light source matrix, wherein each pixel comprises a pixel circuitry comprising 3 TFTs.

FIG. 10 shows an example of four pixel circuitries 20, 32, 34, 36 for four neighbouring pixels, each pixel circuitry 20, 32, 34 or 36 comprise three TFTs 100, 200, 300 according to the third embodiment mentioned above. The four pixels are located adjacent to each other and are addressed by the same y-addressing line 28. The first TFT 100 of the first pixel circuitry 20 is connected to the x-addressing line 26 (X2) of the third pixel circuitry 34—as an enabling function and therefore indicated with reference numeral 30—, to the y-addressing line 28 and to the second TFT 200 of the first pixel circuitry 20. The second TFT 200 of the first pixel circuitry 20 is connected to the first TFT 100 of the first pixel circuitry 20, to an x-addressing line 26 (X0) of the first pixel circuitry 20 and to the third TFT 300 of the first pixel circuitry 20. The third TFT 300 of the first pixel circuitry 20 is connected to the second TFT 200 of the first pixel circuitry 20. The third TFT 300 of the first pixel circuitry 20 is adapted to switch an electrical connection between the analog line 22 through the light source 500 of the first pixel circuitry 32 to the ground GND. The first TFT 100 of the second pixel circuitry 32 is connected to the x-addressing line 26 (X0) of the first pixel circuitry 20—as an enabling function and therefore indicated with reference numeral 30—, to the y-addressing line 28 and to the second TFT 200 of the second pixel circuitry 32. The second TFT 200 of the second pixel circuitry 32 is connected to the first TFT 100 of the second pixel circuitry 32, to an x-addressing line 26 (X1) of the second pixel circuitry 32 and to the third TFT 300 of the second pixel circuitry 32. The third TFT 300 of the second pixel circuitry 32 is connected to the second TFT 200 of the second pixel circuitry 32. The third TFT 300 of the second pixel circuitry 32 is adapted to switch an electrical connection between the analog line 22 through the light source 500 of the second pixel circuitry 32 to the ground GND. The first TFT 100 of the third pixel circuitry 34 is connected to the x-addressing line 26 (X3) of the fourth pixel circuitry 36 as an enabling function and therefore indicated with reference numeral 30, to the y-addressing line 28 and to the second TFT 200 of the third pixel circuitry 34. The second TFT 200 of the third pixel circuitry 34 is connected to the first TFT 100 of the third pixel circuitry 34, to an x-addressing line 26 (X2) of the third pixel circuitry 34 and to the third TFT 300 of the third pixel circuitry 34. The third TFT 300 of the third pixel circuitry 34 is connected to the second TFT 200 of the third pixel circuitry 34. The third TFT 300 of the third pixel circuitry 34 is adapted to switch an electrical connection between the analog line 22 through the light source 500 of the third pixel circuitry 34 to the ground GND. The first TFT 100 of the fourth pixel circuitry 36 is connected to the x-addressing line 26 (X1) of the second pixel circuitry 32—as an enabling function and therefore indicated with reference numeral 30—, to the y-addressing line 28 and to the second TFT 200 of the fourth pixel circuitry 36. The second TFT 200 of the fourth pixel circuitry 36 is connected to the first TFT 100 of the fourth pixel circuitry 36, to an x-addressing line 26 (X3) of the fourth pixel circuitry 36 and to the third TFT 300 of the fourth pixel circuitry 36. The third TFT 300 of the fourth pixel circuitry 36 is connected to the second TFT 200 of the fourth pixel circuitry 36. The third TFT 300 of the fourth pixel circuitry 36 is adapted to switch an electrical connection between the analog line 22 through the light source 500 of the fourth pixel 36 to the ground GND. Likewise to the second embodiment, this embodiment does not have to have a separate enable line on the backplane device for the enablement functionality of a pixel. This can be achieved, if for one pixel, the x-addressing line 26 of one of the other pixels of the four neighbouring pixels is used as the enable line 30 for this pixel. This can be done, if the logic level of the enable line 30 corresponds to the logic level of the x-addressing lines 26. Depending on whether a n-channel or p-channel transfer TFT 300 or n-channel or p-channel selection TFTs 100, 200 are used, the following control schemes need to be applied (X0, X1, X2, X3=signal being applied to the respective x-addressing line 26, Y=signal being applied to the y-addressing line 28):

| Y | X3 | X2 | X1 | X0 | |
|---|---|---|---|---|---|
| n-channel-transfer TFT & n-channel-selection TFT | | | | | |
| 1 | 1 | 1 | 1 | 1 | enable all |
| 1 | 0 | 0 | 0 | 1 | disable Pixel at X3 |
| 1 | 0 | 0 | 1 | 0 | disable Pixel at X2 |
| 1 | 0 | 1 | 0 | 0 | disable Pixel at X1 |
| 1 | 1 | 0 | 0 | 0 | disable Pixel at X0 |
| 1 | 1 | 0 | 0 | 1 | disable Pixel at X0 & X3 |
| 1 | 0 | 1 | 1 | 0 | disable Pixel at X1 & X2 |
| 1 | 1 | 0 | 1 | 0 | enable Pixel at X0 (disable at X2) |
| 1 | 1 | 1 | 0 | 0 | enable Pixel at X1 (disable at X0) |
| 1 | 0 | 0 | 1 | 1 | enable Pixel at X2 (disable at X3) |
| 1 | 0 | 1 | 0 | 1 | enable Pixel at X3 (disable at X1) |
| p-channel-transfer TFT & n-channel-selection TFT | | | | | |
| 1 | 1 | 1 | 1 | 1 | disable all |
| 1 | 0 | 0 | 0 | 1 | enable Pixel at X3 |
| 1 | 0 | 0 | 1 | 0 | enable Pixel at X2 |
| 1 | 0 | 1 | 0 | 0 | enable Pixel at X1 |
| 1 | 1 | 0 | 0 | 0 | enable Pixel at X0 |
| 1 | 1 | 0 | 0 | 1 | enable Pixel at X0 & X3 |
| 1 | 0 | 1 | 1 | 0 | enable Pixel at X1 & X2 |
| 1 | 1 | 0 | 1 | 0 | disable Pixel at X0 (disable at X2) |
| 1 | 0 | 0 | 1 | 1 | disable Pixel at X1 (enable at X0) |
| 1 | 1 | 1 | 0 | 0 | disable Pixel at X2 (enable at X3) |
| 1 | 1 | 0 | 1 | 0 | disable Pixel at X3 (enable at X1) |
| p-channel-transfer TFT & p-channel-selection TFT | | | | | |
| 0 | 0 | 0 | 0 | 0 | enable all |
| 0 | 1 | 1 | 1 | 0 | disable Pixel at X3 |
| 0 | 1 | 1 | 0 | 1 | disable Pixel at X2 |
| 0 | 1 | 0 | 1 | 1 | disable Pixel at X1 |
| 0 | 0 | 1 | 1 | 1 | disable Pixel at X0 |
| 0 | 0 | 1 | 1 | 0 | disable Pixel at X0 & X3 |
| 0 | 1 | 0 | 0 | 1 | disable Pixel at X1 & X2 |
| 0 | 0 | 1 | 0 | 1 | enable Pixel at X0 (disable at X2) |
| 0 | 0 | 0 | 1 | 1 | enable Pixel at X1 (disable at X0) |
| 0 | 1 | 1 | 0 | 0 | enable Pixel at X2 (disable at X3) |
| 0 | 1 | 0 | 1 | 0 | enable Pixel at X3 (disable at X1) |
| n-channel-transfer TFT & p-channel-selection TFT | | | | | |
| 0 | 0 | 0 | 0 | 0 | disable all |
| 0 | 1 | 1 | 1 | 0 | enable Pixel at X3 |
| 0 | 1 | 1 | 0 | 1 | enable Pixel at X2 |
| 0 | 1 | 0 | 1 | 1 | enable Pixel at X1 |
| 0 | 0 | 1 | 1 | 1 | enable Pixel at X0 |
| 0 | 0 | 1 | 1 | 0 | enable Pixel at X0 & X3 |
| 0 | 1 | 0 | 0 | 1 | enable Pixel at X1 & X2 |
| 0 | 0 | 1 | 0 | 1 | disable Pixel at X0 (enable at X2) |
| 0 | 0 | 0 | 1 | 1 | disable Pixel at X1 (enable at X0) |
| 0 | 1 | 1 | 0 | 0 | disable Pixel at X2 (enable at X3) |
| 0 | 1 | 0 | 1 | 0 | disable Pixel at X3 (enable at X1) |

While the present invention has been described in conjunction with a specific embodiment, it is understood that many alternatives, modifications and variations will be apparent to those skilled in the art in light of the foregoing description. In particular, a person skilled in the art derives from the backplane device disclosed in the drawings and the description of this application a method to operate the backplane device according to the present invention and/or to use the backplane device according to the present invention for a specific purpose, e.g. to use it for a display device. Accordingly, this invention is intended to embrace all such alternatives, modifications and variations which fall within the scope of the appended claims.

The invention claimed is:

1. A backplane device for a light source matrix, comprising:
one or more pixels, each pixel comprising:
a light source comprising an LED or an OLED;
pixel circuitry corresponding to said light source, wherein the pixel circuitry of each pixel is assigned only to its corresponding light source for controlling said light source;
the pixels of the light source matrix are classified according to a pixel characteristic;
the order of switching light sources on or off depends on the characteristics of a pixel and not on a location of the pixel on the backplane device, where the single pixels of the light source matrix are addressed in a random access manner to the backplane device;
a current being applied to each light source is controlled by at least one driver;
the at least one driver is electrically connectable to at least one pixel; and
the at least one driver does not belong to the pixel circuitry of the pixel.

2. The backplane device according to claim 1, wherein a pixel value to be assigned to a pixel depends on at least one of the following: the current to be applied to the light source of the pixel and the duration for which current is applied to the light source of the pixel.

3. The backplane device according to claim 1, wherein the light source or an LED or an OLED comprises a threshold value and wherein the pixel characteristic is the threshold value of such a light source.

4. The backplane device according to claim 1, wherein the pixel characteristic is the brightness or the current value with which the light source of the pixel is to be operated.

5. The backplane device according to claim 4, wherein the light source of the pixel is to be operated for a pre-determinable time period.

6. The backplane device according to claim 1, wherein an addressing of the pixels for an enablement or a disablement of the pixels is carried out for the pixels comprising essentially the same pixel characteristics or wherein the addressing of the pixels comprising the same pixel value is performed in temporal proximity to each other in one operation mode of the backplane device or wherein in another operation mode of the backplane device at essentially the same time or wherein in still another operation mode of the backplane device in at least one of the following: a period of time and a time a pixel value is assigned to only one pixel.

7. The backplane device according to claim 1, wherein the at least one driver is adapted such that the current flowing through a light source comprises essentially a constant value or wherein the at least one driver is adapted such that the current flowing through a light source comprises essentially a constant value during a pre-determinable time period in which the pixel is activated.

8. The backplane device according to claim 1, wherein a current characteristic is applied to pre-determinable light sources of the light source matrix, the current characteristic being at least one of the following: a current ramp up function and a current ramp down function and a saw-tooth like function, or wherein the current characteristic comprises a higher current value for a shorter predetermined activation time compared to the usual driving properties of the light sources or wherein the current characteristic comprises a lower current value for a longer predetermined activation time compared to the usual driving properties of the light sources.

9. The backplane device according to claim 1, wherein a current characteristic is applied to pre-determinable light sources of the light source matrix, the current characteristic is variable in time and has predominantly the characteristic of a mathematically monotonic function or of a mathematically monotonic function being monotonic increasing or monotonic decreasing.

10. The backplane device according to claim 1, wherein the generated current characteristic being applied to at least one analog line determines the order of addressing of the pixels.

11. The backplane device according to claim 1, wherein pixel addresses being determined are generated for an x-direction and for a y-direction and wherein an assignment of a pixel value to a pixel is carried out in a random access manner with respect to the x-direction and to the y-direction.

12. The backplane device according to claim 1, comprising at least one of the following: at least one enable line and at least one analog line, every pixel circuitry being connected to at least one of the following: to an enable line and to an analog line.

13. The backplane device according to claim 12, wherein a pixel circuitry comprises three TFTs, wherein a first TFT is connected to the enable line, to an x-addressing line and to a second TFT, wherein the second TFT is connected to the first TFT, to a y-addressing line and to a third TFT, wherein the third TFT is connected to the second TFT and wherein the third TFT is adapted to switch electrical connection between the analog line through the light source to the ground.

14. The backplane device according to claim 12, wherein a pixel circuitry comprises three TFTs, wherein for two pixels being located adjacent to each other and being addressed by the same y-addressing line, a first TFT of the first pixel is—as an enabling function—connected to the x-addressing line of the second pixel, to the y-addressing line and to a second TFT of the first pixel, wherein the second TFT of the first pixel is connected to the first TFT of the first pixel, to an x-addressing line of the first pixel and to a third TFT of the first pixel, wherein the third TFT of the first pixel is connected to second TFT of the first pixel and wherein the third TFT of the first pixel is adapted to switch an electrical connection between the analog line through the light source of the first pixel to the ground, wherein the first TFT of the second pixel is—as an enabling function—connected to the x-addressing line of the first pixel, to the y-addressing line and to the second TFT of the second pixel, wherein the second TFT of the second pixel is connected to the first TFT of the second pixel, to an x-addressing line of the second pixel and to the third TFT of the second pixel and wherein the third TFT of the second pixel is connected to the second TFT of the second pixel and wherein the third TFT of the second pixel is adapted to switch an electrical connection between the analog line through the light source of the second pixel to the ground.

15. The backplane device according to claim 12, wherein a pixel circuitry comprises three TFTs, wherein for four pixels being located adjacent to each other and being addressed by the same y-addressing line, wherein a first TFT of the first pixel is—as an enabling function—connected to the x-addressing line of the third pixel, to the y-addressing line and to a second TFT of the first pixel, wherein the second TFT of the first pixel is connected to the first TFT of the first pixel, to an x-addressing line of the first pixel and to the third TFT of the first pixel, wherein a third TFT of the first pixel is connected to the second TFT of the first pixel and wherein the third TFT of the first pixel is adapted to switch an electrical connection between the analog line through the light source of the first pixel to the ground, wherein the first TFT of the second pixel is—as an enabling function—connected to the x-addressing line of the first pixel, to the y-addressing line and to the second TFT of the second pixel, wherein the second TFT of the second pixel is connected to the first TFT of the second pixel, to an x-addressing line of the second pixel and to the third TFT of the second pixel, wherein the third TFT of the second pixel is connected to the second TFT of the second pixel, and wherein the third TFT of the second pixel is adapted to switch an electrical connection between the analog line through the light source of the second pixel to the ground, wherein the first TFT of the third pixel is—as an enabling function—connected to the x-addressing line of the fourth pixel, to the y-addressing line and to the second TFT of the third pixel, wherein the second TFT of the third pixel is connected to the first TFT of the third pixel, to an x-addressing line of the third pixel and to the third TFT of the third pixel, wherein the third TFT of the third pixel is connected to the second TFT of the third pixel, and wherein the third TFT of the third pixel is adapted to switch an electrical connection between the analog line through the light source of the third pixel to the ground, wherein the first TFT of the fourth pixel is—as an enabling function— connected to the x-addressing line of the second pixel, to the y-addressing line and to the second TFT of the fourth pixel, wherein the second TFT of the fourth pixel is connected to the first TFT of the fourth pixel, to an x-addressing line of the fourth pixel and to the third TFT of the fourth pixel, wherein the third TFT of the fourth pixel is connected to the second TFT of the fourth pixel, and wherein the third TFT of the fourth pixel is adapted to switch an electrical connection between the analog line through the light source of the fourth pixel to the ground.

16. The backplane device according to claim 12, wherein a first TFT of a pixel and a second TFT of the same pixel are combined into a dual gate TFT.

17. The backplane device according to claim 12, wherein an enable line or the x-addressing line serving as an enable line is connected with the source of a first TFT of a pixel or wherein the drain of the first TFT of a pixel is connected to the source of a second TFT of the same pixel or wherein the drain of the second TFT of a pixel is connected to the gate of the third TFT of the same pixel.

18. The backplane device according to claim 12, wherein the analog line is connected to the source of a third TFT of a pixel and the light source of the same pixel being connected to the ground is connected with the drain of the third TFT of the same pixel or wherein the analog line being connected to the light source of a pixel is connected to the source of the third TFT of the same pixel and the ground is connected with the drain of the third TFT of the same pixel.

19. The backplane device according to claim 1, comprising at least one pixel addressing means, wherein such a pixel addressing means comprises x-addressing lines and y-addressing lines, wherein every pixel circuitry is connected to an x-addressing line and to a y-addressing line.

20. The backplane device according to claim 19, wherein an x-addressing line or a y-addressing line is connected with the gate of a first TFT of a pixel or with the gate of a second TFT of the pixel or with the gates of the dual gate TFT combined by the first TFT of a pixel and the second TFT of the same pixel.

21. The backplane device according to claim 1, wherein the pixel addressing means comprises at least one x-address decoder and at least one y-address decoder, the x-address decoder being connected to the x-addressing lines and the y-address decoder being connected to the y-addressing lines.

22. The backplane device according to claim 21, wherein at least one of the x-address decoder and the y-address decoder is arranged separately from the backplane device or wherein at least one of the x-address decoder and the y-address decoder is located at the outside edge of the backplane device or wherein at least one of the x-address decoder and the y-address decoder is located on the backplane device between the pixels.

23. The backplane device according to claim 1, comprising a pixel measurement scheme including a measurement function of a pixel being applied during a predetermined time period or for a partial time of a frame time, the pixel measurement of a pixel is carried out with the help of the at least one driver being connected to the pixel.

24. The backplane device according to claim 23, wherein the gate of the transfer transistor of a pixel circuitry is connected to the enable line by addressing the x-addressing line and the y-addressing line of the pixel, wherein a variable voltage function is applied on the enable line, the variable voltage function comprising applying increasing or decreasing voltage values from a first voltage value to a second voltage value, and wherein a measuring means is adapted to measure at which voltage value of the variable voltage function a current flows or does not flow any more between the analog line through the light source of the pixel to the ground.

25. The backplane device according to claim 23, wherein the pixel circuitry of a pixel is addressed by the addressing means such that a current flow from the analog line through the light source of that pixel to ground is enabled, wherein a current function is applied on the analog line, the current function comprising applying increasing or decreasing current values from a first current value to a second current value, a measuring means measuring the actual current flowing between the analog line through the light source of the pixel to the ground.

26. The backplane device according to claim 1, comprising a circuitry being made of a-Si or a-Oxide or poly-Si or organic electronic material.

27. The backplane device according to claim 1, wherein at least one of the light source matrix and the backplane device comprises a cluster arrangement of at least two clusters of pixels and wherein each cluster comprises an analog line and a pixel addressing means for addressing the pixels of the cluster.

28. The backplane device according to claim 27, wherein the clusters are controlled independently from each other or wherein a plurality of pixels forming a connected or a contiguous region of the light source matrix form a cluster or wherein a plurality of pixels forming a connected or a contiguous region of the light source matrix form a cluster and wherein such a region comprises a rectangular shape or a square shape or a honeycomb shape or wherein a plurality of pixels forming a connected or a contiguous region of the light source matrix form a cluster and wherein a cluster does not extend over a full width or a full length of the light source matrix.

29. A light source matrix or a light source matrix for a display device for generating at least one of a two-dimensional and three-dimensional representation of a scene or of content, comprising a backplane device according to claim 1.

30. A display device for generating at least one of a two-dimensional and three-dimensional representation of a scene or a stereoscopic or a holographic display device, comprising a backplane device according to claim 1.

31. A method for operating a backplane device for a light source matrix or a method for operating a backplane device for a light source matrix wherein a light source is a LED or an OLED, or a method for operating the backplane device according to claim 1, wherein a pixel circuitry of the backplane device is assigned to a light source of the light source matrix for controlling the light source, wherein one light source and one pixel circuitry constitute a pixel, wherein the pixels of the light source matrix or of a cluster of the light source matrix are classified according to a pixel characteristic, wherein the order of switching the light sources on or off depends on the pixel characteristic and not necessarily on the location of the pixel on the backplane device, wherein a current being applied to the light sources is controlled by at least one driver, wherein the at least one driver is electrically connectable to at least one pixel and the at least one driver is not belonging to the pixel circuitry of the pixel.

32. A backplane device for a light source array or a backplane device for a light source matrix or a backplane device for a light source matrix in a display device for generating at least one of a two-dimensional and three-dimensional representation of a scene or of content, the light source array or the light source matrix comprising pixels having pixel addresses and being electronically controllable by the backplane device for assigning pixel values to the pixels, the backplane device comprising at least one light source for each pixel, at least one analog line and at least one pixel addressing means, wherein such a pixel addressing means comprises x-addressing lines and y-addressing lines, wherein every pixel is connected to an analog line, to an x-addressing line and to a y-addressing line, wherein as a pixel value assigning scheme a generating means is adapted to generate a current characteristic to be applied to the at least one analog line such that the current characteristic depends on the pixel values to be assigned to the pixels, wherein the backplane device is adapted such that the order of addressing the pixels and the duration of operation of the light sources of the pixels are determined by the pixel values to be displayed by the pixels, where the single pixels of the light source matrix are addressed in a random access manner to the backplane device.

\* \* \* \* \*